United States Patent [19]
Owen

[11] Patent Number: 5,168,627
[45] Date of Patent: Dec. 8, 1992

[54] RAILROAD TIE END PLATE ATTACHMENT METHOD

[75] Inventor: S. Hudson Owen, Marshfield, Wis.

[73] Assignee: Kerr-McGee Chemical Corporation, Oklahoma City, Okla.

[21] Appl. No.: 779,781

[22] Filed: Oct. 21, 1991

[51] Int. Cl.[5] .............................................. B27F 7/05
[52] U.S. Cl. .................................. 29/897.34; 29/407; 29/417; 29/432; 29/705; 29/716; 227/100
[58] Field of Search ..................... 29/17.1, 17.2, 407, 29/897.34, 412, 417, 432, 432.1, 446, 464, 466, 525, 33 R, 33 U, 34 R, 566, 566.1, 705, 714, 716; 100/232; 227/5-7, 41, 42, 103, 106, 152, 153

[56] References Cited

U.S. PATENT DOCUMENTS

| | | |
|---|---|---|
| 1,404,279 | 1/1922 | Davis ........................... 29/897.34 X |
| 3,241,424 | 3/1966 | Moehlenpah et al. . |
| 3,322,018 | 5/1967 | Moehlenpah et al. . |
| 3,362,277 | 1/1968 | Moehlenpah et al. . |
| 3,417,651 | 12/1968 | Moehlenpah . |
| 3,419,205 | 12/1968 | Jureit et al. . |
| 3,540,107 | 11/1970 | Jureit et al. . |
| 3,951,033 | 4/1976 | Moehlenpah et al. . |
| 4,351,465 | 9/1982 | Moehlenpah et al. . |
| 4,373,652 | 2/1983 | Matlock et al. . |
| 4,494,685 | 1/1985 | Matlock . |
| 4,504,006 | 3/1985 | Lollar, Sr. . |
| 4,513,900 | 4/1985 | Matlock . |
| 4,657,168 | 4/1987 | Matlock . |

FOREIGN PATENT DOCUMENTS 25512 11/1963 Japan ............................... 29/897.34

Primary Examiner—Timothy V. Eley
Attorney, Agent, or Firm—Herbert M. Hanegan

[57] ABSTRACT

A method and apparatus for automatically attaching end plates to the ends of a railroad tie. A web of material automatically is fed to a plate assembly position. A portion of the web of material is formed into an end plate at the plate assembly position. The formed end plate is removed from the web of material. The formed end plate then automatically is connected to one end of the railroad tie. The system also senses the size of the end of the railroad tie and the end plate formed at the plate assembly position automatically is sized to be about the same size as the sensed size of the end of the railroad tie.

13 Claims, 12 Drawing Sheets

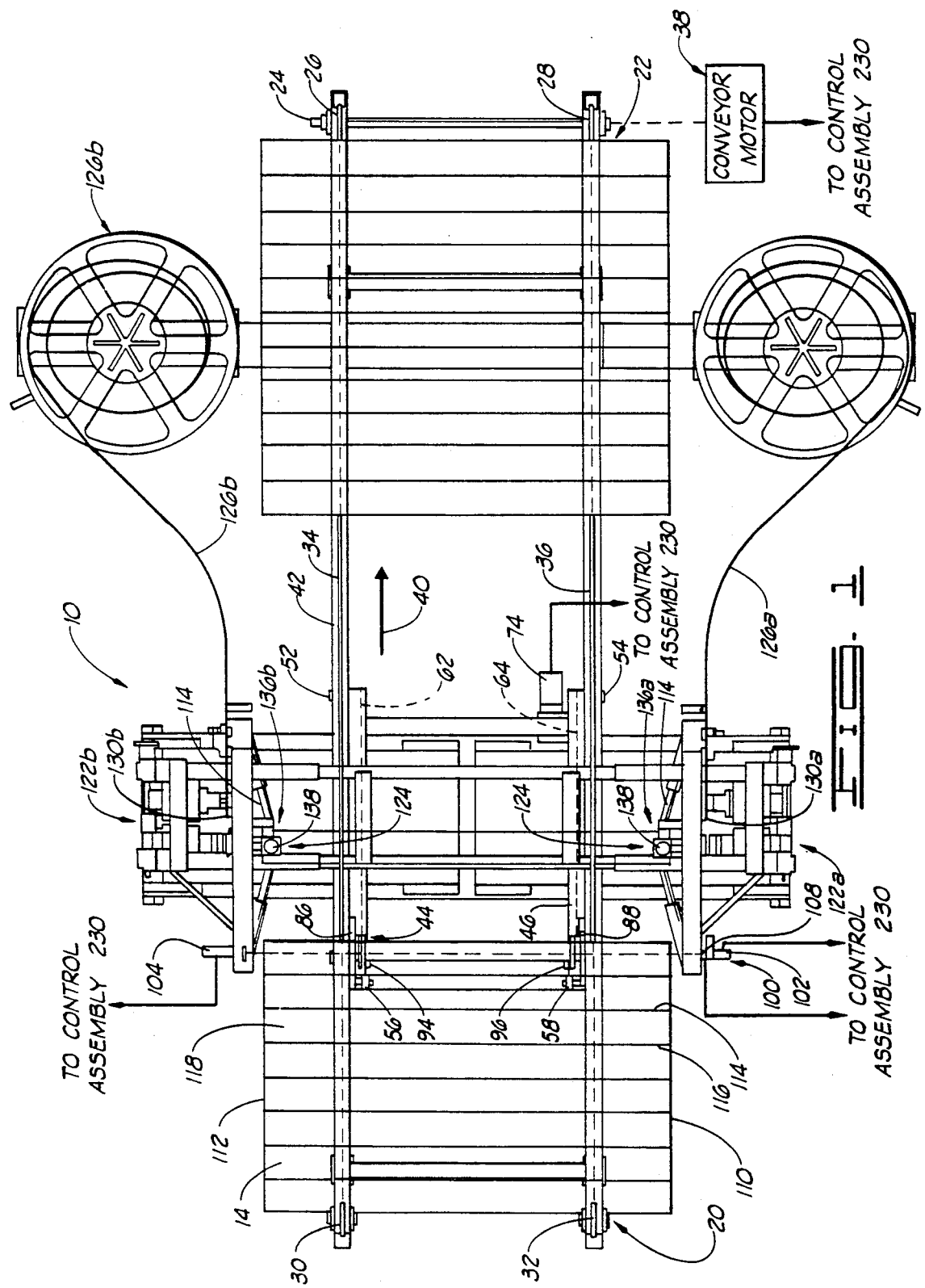

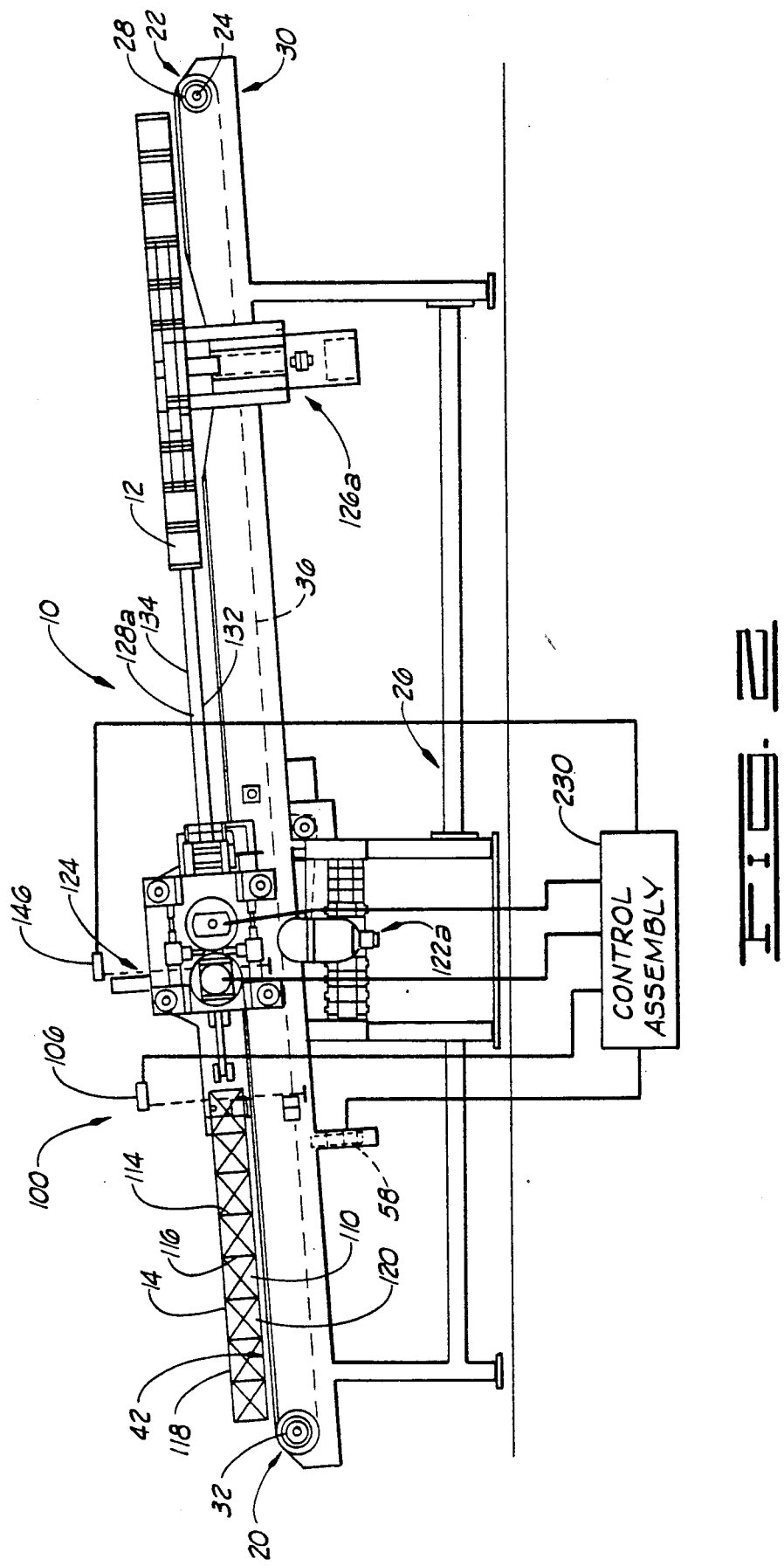

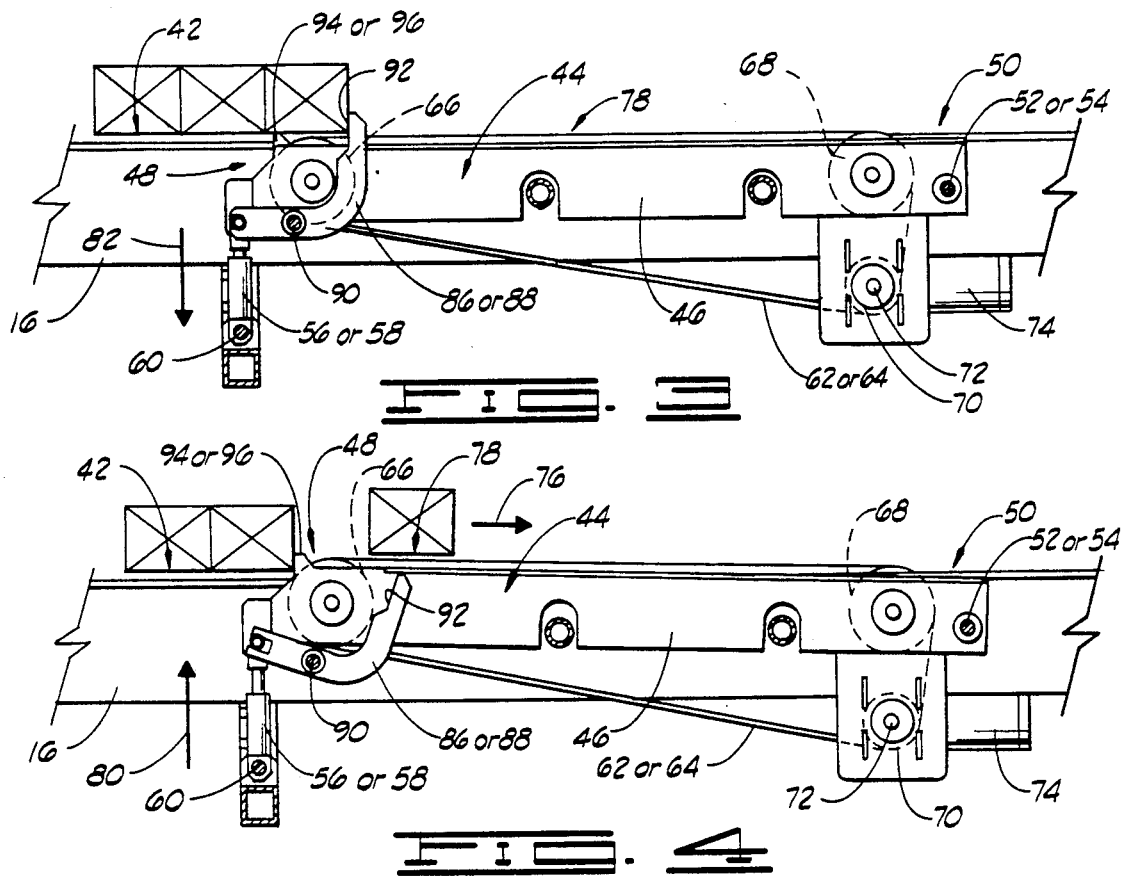
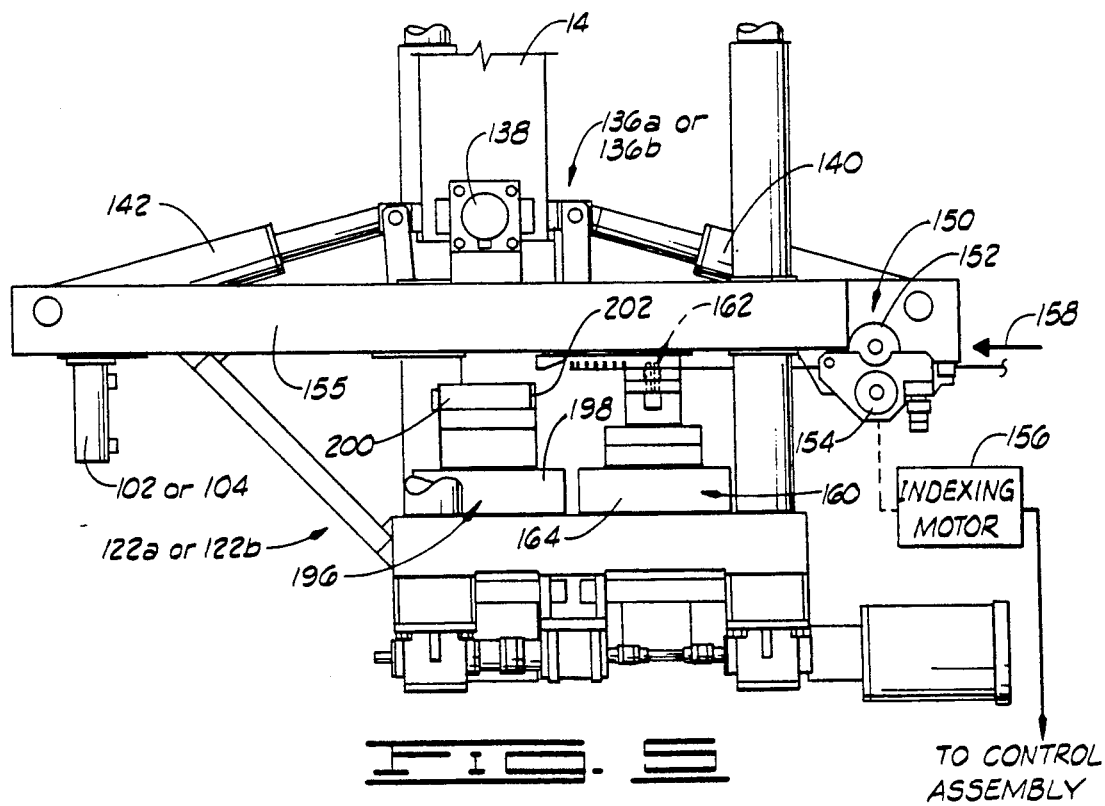

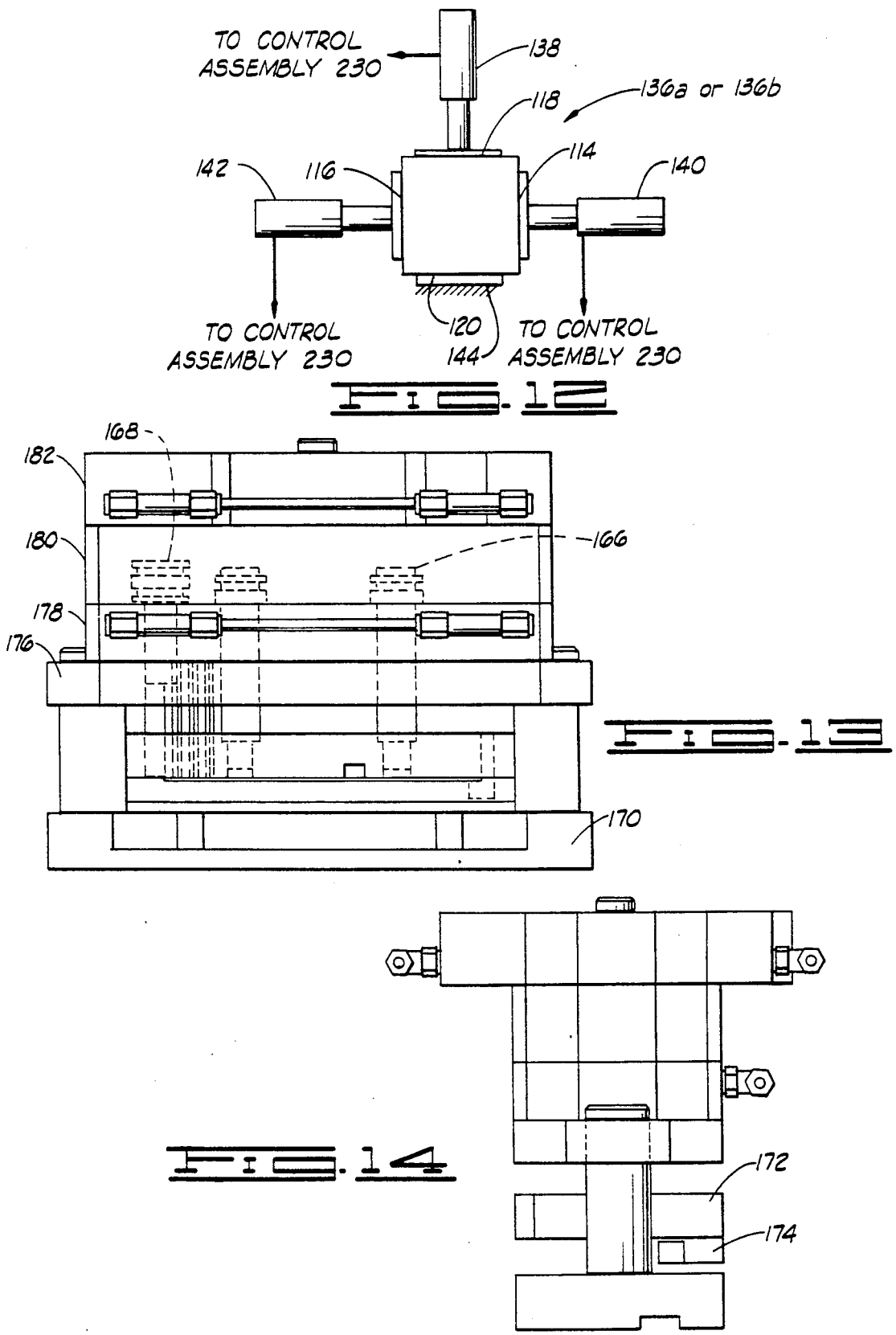

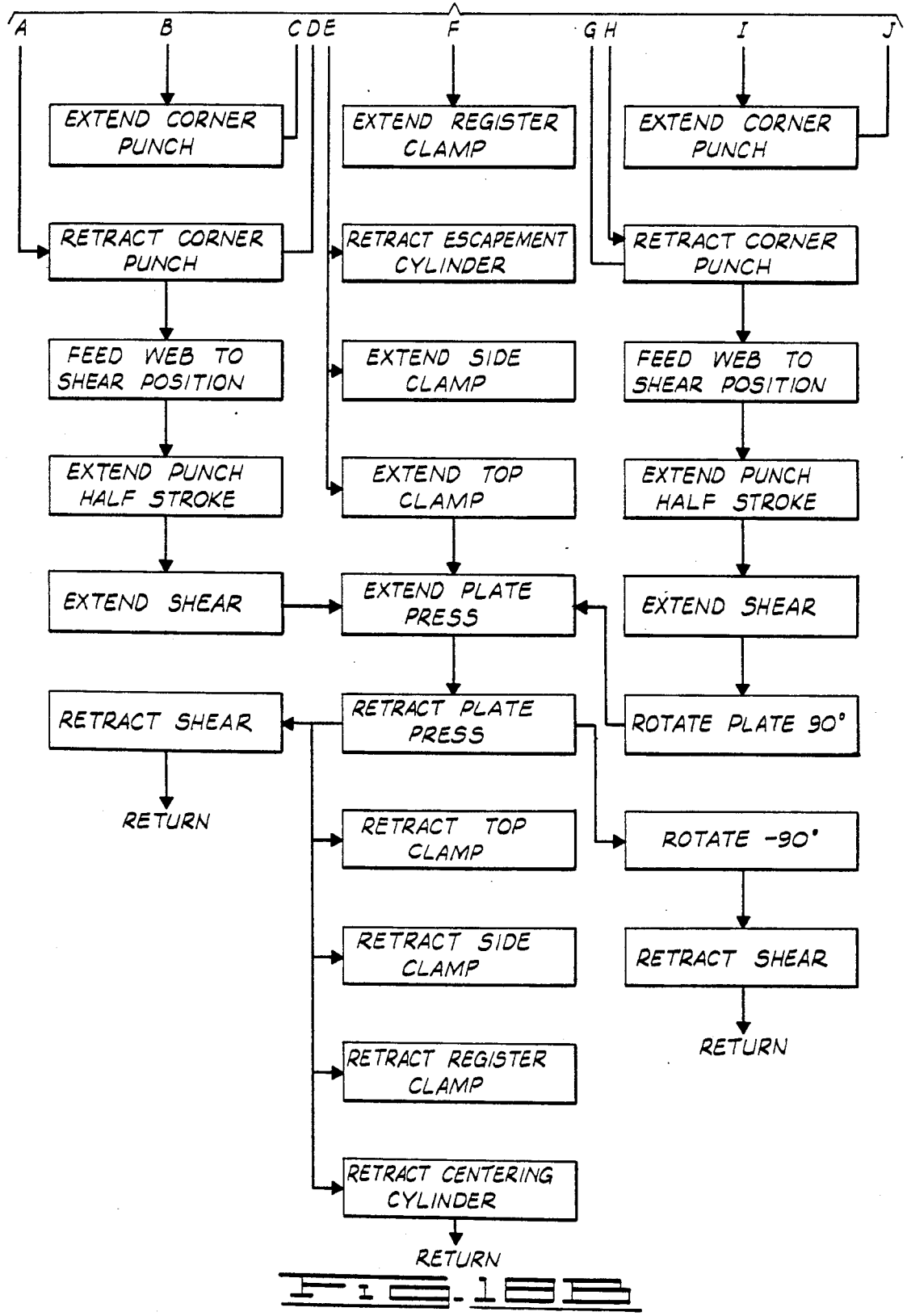

RAILROAD TIE END PLATE ATTACHMENT METHOD

FIELD OF THE INVENTION

The present invention relates generally to systems for attaching end plates to railroad ties and, more particularly, but not by way of limitation, to a system for automatically forming or manufacturing end plates from webs of material and automatically attaching the formed end plates to the opposite ends of the railroad tie.

BRIEF DESCRIPTION OF THE DRAWINGS

FIG. 1 is a top plan view of an apparatus for manufacturing and attaching or connecting end plates to railroad ties constructed and operated in accordance with the present invention.

FIG. 2 is a side elevational view of the apparatus shown in FIG. 1.

FIG. 3 is a typical side elevational view showing a portion of the main conveyor and showing the speed-up conveyor of the apparatus shown in FIGS. 1 and 2, the speed-up conveyor being shown in a non-elevated or lowered position.

FIG. 4 is a view similar to FIG. 3, but showing the speed-up conveyor in an elevated or raised position.

FIG. 5 is a top elevational view of a typical press assembly showing a die set assembly portion thereof in a position punching holes and forming nail members in a portion of the web of material and showing the press head assembly in a retracted position (the die set assembly being shown forming the end plate).

FIG. 12 is a diagrammatic view of a typical clamp assembly for clamping the ends of the first size railroad tie prior to installing or connecting the end plate thereto, the clamp assembly being shown in FIG. 12 in a position compressing the end of the first size railroad tie.

FIG. 13 is a side elevational view of a portion of the die set assembly of the press assembly of the present invention.

FIG. 14 is a end elevational view of the portion of the die set assembly shown in FIG. 13.

FIG. 16 is an exploded view of the press head portion of the press head assembly of the present invention.

DESCRIPTION OF THE PREFERRED EMBODIMENTS

Figure 6:
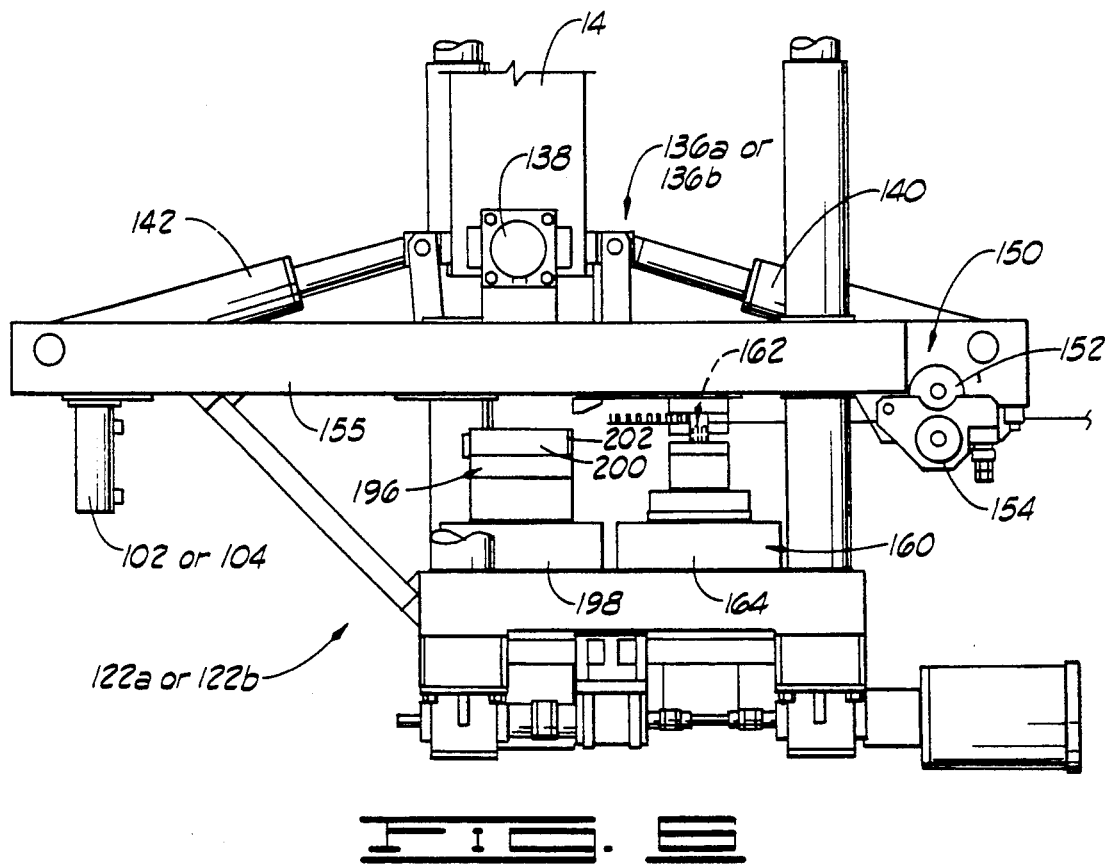
FIG. 6 is a view similar to FIG. 5, but showing the die set assembly with the punches retracted prior to indexing or moving the web of material to a press head assembly portion of the press assembly.

Railroad ties commonly develop splits or openings in one or both of the ends of the railroad ties. Left unattended, such splits or openings can continue to enlarge to an extent that the railroad tie is rendered useless. In the past, it has been common to nail or connect end plates to the ends of the railroad ties to prevent either the formation of such splits or openings or the further enlargements of such splits or openings.

The system of the present invention automatically manufactures the end plates and automatically connects the end plates to the opposite ends of the railroad tie. In addition, the system of the present invention is adapted to sense the size of the railroad tie and manufacture the end plates in a size corresponding to the sensed size of the railroad tie.

Shown in FIGS. 1 and 2 is an apparatus 10 constructed in accordance with the present invention for automatically producing or manufacturing end plates 12 and connecting the end plates to the opposite ends of a railroad tie 14. A number of end plates 12 are shown in FIG. 2 and only one of the end plates 12 is shown in FIG. 2 designated with a specific reference numeral 12 (typical end plates 12 being shown in greater detail in FIGS. 10, 11, 10A and 11A). A number of railroad ties 14 are shown in FIGS. 1 and 2 and only one of the railroad ties 14 is designated by the specific reference numeral 14 in the FIGS. 1 and 2.

The apparatus 10 includes a main frame 16 having an opposite ends and opposite sides. A main conveyor 18 is supported on the main frame 16. The main conveyor 18 has an entry end 20 and an exit end 22. The main frame 16 and the main conveyor 18 supported thereon are inclined so that the exit end 22 of the main conveyor 18 is disposed in a plane spaced a distance above the entry end 20 of the main conveyor 18.

A conveyor shaft 24 is generally connected to the main frame 16 and extends generally between the opposite sides of the main frame 16. The conveyor shaft 24 is disposed near the exit end 22 of the main conveyor 18. A pair of drive sprockets 26 and 28 are secured to the conveyor shaft 24 with the drive sprocket 26 being disposed near one side of the main frame 16 and the other drive sprocket 28 being disposed near the opposite side of the main frame 16. An idler sprocket 30 is generally supported on the main frame 16 near one side of the main frame 16. Another idler sprocket 32 is generally supported on the main frame 16 opposite the idler sprocket 30. A first chain 34 is extended between the sprockets 26 and 30 and a second chain 36 is extended between the sprockets 28 and 32.

A conveyor motor 38 (FIG. 1) is connected to the conveyor shaft 24 for drivingly rotating the conveyor shaft 24. The conveyor motor 38 drivingly rotates the conveyor shaft 24 in a direction such that the main conveyor 18 is drivingly rotated in a direction 40 (FIG. 1) from entry end 20 toward the exit end 22 of the main conveyor 18. An upper portion of each of the chains 34 and 36 comprises the conveying surface 42 (the upper portion of the chain 36 not being shown in FIG. 2). The conveying surface 42 more particularly is driven in the direction 40 in a driven condition of the main conveyor 18.

The conveying surface 42 is angled upwardly toward the exit end 22 of the main conveyor 18. The conveying surface 42 is adapted to receive the railroad ties 14 which are conveyed by the main conveyor 18 on the conveying surface 42 during the operation of the apparatus 10, as will be described in greater detailed below.

The apparatus 10 also includes a speed-up conveyor 44, as shown in FIGS. 1, 3 and 4. The speed-up conveyor 44 is disposed between the entry end 20 and the exit end 22 of the main conveyor 18. The speed-up conveyor 44 is disposed between the chains 34 and 36 of the main conveyor 36 so the speed-up conveyor 44 can be moved upwardly through the main conveyor 18 for reasons which will be made more apparent below.

The speed-up conveyor 44 comprises a speed-up conveyor frame 46 having an entry end 48 and an exit end 50, as shown in FIGS. 3 and 4. The exit end 50 of the speed-up conveyor frame 46 is pivotally connected to the main frame 16 via pivot rods 52 and 54 (FIGS. 1, 3 and 4). The entry end 48 of the speed-up conveyor frame 46 is connected to the main frame 16 by way of a pair of escapement cylinders 56 and 58 (FIGS. 2, 3 and 4). Each of the escapement cylinders 56 and 58 is pivotally connected to the main frame 16 via a pivot rod 60 (FIGS. 3 and 4) and the cylinder rod portions of the respective escapement cylinders 56 and 58 are connected to the speed-up conveyor frame 46 near the entry end 48.

The speed-up conveyor 44 also comprises a pair of chains 62 and 64 (FIGS. 3 and 4). Each of the chains 62 and 64 is supported on the speed-up conveyor frame 46 via idler sprockets 66 and 68 (FIGS. 3 and 4) and a drive sprocket 70 (FIGS. 3 and 4). The idler sprockets 66 and 68 and the drive sprockets 70 each are journally supported on the speed-up conveyor frame 46. The drive sprockets 70 are connected by way of respective drive sprocket shafts 72 (FIGS. 3 and 4). A conveyor motor 74 (FIGS. 1, 3 and 4) is connected to one of the drive sprocket shafts 72 for drivingly rotating the drive sprockets 70 thereby causing the speed-up conveyor 44 to be moved in a direction 76 (FIG. 4) generally from the entry end 48 toward the exit end 50 of the speed-up conveyor 44.

The chains 62 and 64 have conveying surface 78 (FIGS. 3 and 4) which is adapted to receive and convey or move the railroad ties 14 during the operation of the apparatus 10. The speed-up conveyor 44 is supported on the speed-up conveyor frame 46 and positioned so that the conveying surface 78 of the speed-up conveyor 44 is disposed in a plane spaced a distance below the plane of the conveying surface 42 of the main conveyor 18 in a lowered position of the speed-up conveyor 44 (shown in FIG. 3). The escapement cylinders 56 and 58 each are actuatable to move the entry end 48 of the speed-up conveyor frame 46 in an upwardly direction 80 (FIG. 4) for moving the speed-up conveyor 44 from the lowered position to a raised position shown in FIG. 4. In the raised position, the conveying surface 78 of the speed-up conveyor 44 is disposed in a plane spaced a distance above the planar disposition of the conveying surface 42 of the main conveyor 18.

The apparatus 10 also includes a pair of escapement stops 86 and 88 (FIGS. 1, 3 and 4). Each escapement stop 86 and 88 has opposite ends. One end of each escapement stop 86 and 88 is slidingly connected to the cylinder rod of the respective escapement cylinder 56 or 58. A portion of each escapement stop 86 and 88, generally between the opposite ends thereof, is pivotally connected to the main frame 16 by way of a pivot rod 90 (FIGS. 3 and 4). A stop surface 92 (FIGS. 3 and 4) is formed on the end of each escapement stop 86 and 88, opposite the end slidingly connected to the respective escapement cylinder 56 or 58.

Each of the escapement stops 86 and 88 has a release position (FIG. 4) and a stop position (FIG. 3). In the release position, the stop surfaces 92 are disposed above the conveying surface 42 of the main conveyor 18. In the release position, stop surfaces 92 of the escapement stops 86 and 88 are disposed in a plane below the conveying surface 42 of the main conveyor 18.

The escapement stops 86 and 88 are connected to the main frame 16 and to the respective escapement cylinders 56 and 58 so that, when the escapement cylinders 56 and 58 are actuated to move the cylinder rods thereof in the upwardly direction 80, the escapement stops 86 and 88 are pivotally moved to lower the respective stop surfaces 92 to the release position. Further, when the escapement cylinders 56 and 58 are actuated to move the respective cylinder rods thereof in the downwardly direction 82, the escapement stops 86 and 88 are pivotally moved to move the respective stop surfaces 92 to the stop position. In the stop position, the stop surfaces 92 are positioned to engage one of the railroad ties 14 moving on the main conveyor 18, for reasons to be described in greater detail below.

A pair of stops 94 and 96 (FIGS. 1, 3 and 4) are formed on the speed-up conveyor frame 46 near the entry end 48 thereof. The stops 94 and 96 are formed on opposite sides of the speed-up conveyor frame 46. The stops 94 and 96 are positioned on the speed-up conveyor frame 46 so that each of the stops 94 and 96 is disposed below the conveying surface 42 of the main conveyor 18 in the lowered positioned of the speed-up conveyor 44. Further, each of the stops 94 and 96 is positioned on the speed-up conveyor frame 46 so that each of the stops 94 and 96 is disposed above the conveying surface 42 of the main conveyor 18 in the raised position of the speed-up conveyor frame 46, for reasons which will be made more apparent below.

The escapement stops 86 and 88 each are located at an initial feed position 100 (FIGS. 1 and 2) spaced a distance from the entry end 20 of the main conveyor 18 and spaced generally between the entry end 20 and the exit end 22 of the main conveyor 18. A pair of centering cylinders 102 and 104 (FIGS. 1 and 5-9) are supported at the initial feed position 100. The centering cylinders 102 and 104 are disposed on the opposite sides of the main frame 16 and on opposite sides of the main conveyor 18. The centering cylinder 102 is aligned with the centering cylinder 104.

An initial feed position sensor 106 (FIG. 2) is supported at the initial feed position 100. The initial feed position sensor 106 is adapted to sense the presence of one of the railroad ties 14 at the initial feed position 100 and to output a signal indicating the presence of the railroad tie 14 positioned at the initial feed position 100. The initial feed position sensor 106 is a photoelectric type of sensor.

A sizing sensor 108 (FIG. 1) is disposed and supported at the initial feed position 100. The sizing sensor 108 is adapted to sense the size of the railroad tie 14 disposed at the initial feed position 100 and to output a signal indicative of the sensed size of the railroad tie 14 disposed at the initial feed position 100. The sizing sensor 108 is a photoelectric type of sensor.

Each railroad tie has a first end 110 (FIGS. 1 and 2), a second end 112 (FIG. 1), a first side 114 (FIGS. 1 and 2), a second side 116 (FIGS. 1 and 2), an upper surface 118 (FIGS. 1 and 2) and a lower surface 120 (FIG. 1). The first end 110, the second end 112, the first side 114, the second side 116, the upper surface 118 and the lower surface 120 are designated by reference numerals in FIGS. 1 and 2 only with respect to one of the railroad ties 14.

The apparatus 10 is adapted to manufacture and connect end plates 12 on two different sizes of railroad ties 14. A first size of railroad tie 14 has a width of about eight inches extending between the first and the second sides 114 and 116 and a height of about six inches extending between the upper and the lower surfaces 118 and 120. A second size of railroad tie 14 has a width of about nine inches extending between the first and the second sides 114 and 116 and a height of about seven inches extending between the upper and the lower surfaces 118 and 120. Thus, the height of the second size of railroad tie 14 is about one inch higher or greater than the height of the first size of railroad tie 14. The sizing sensor 108 more particularly is positioned at a position slightly greater than six inches above the conveying surface 42 of the main conveyor 18. When a first size of railroad tie 14 is positioned at the initial feed position 100, the sizing sensor 108 is positioned above the height (six inches) of the second size of railroad tie 14 and light is passed between the two elements of the sizing sensor (designated "light" in FIGS. 18A and 18B). By the token, when a first size of railroad tie 14 is positioned at the initial feed position 100 light is not passed between the two elements of the sizing sensor 108 because the sizing sensor 108 is positioned above six inches and below seven inches above the conveying surface 42 of the main conveyor 18 and the seven inch height of the railroad tie 14 thus intersects the light (designated "dark" in FIGS. 18A and 18B). The sizing sensor 108 thus outputs a signal indicating whether a first size (light) or a second size (dark) of railroad tie 14 is positioned at the initial feed position 100.

The apparatus 10 includes two press assemblies 122 with the press assemblies being designated in FIGS. 1, 2 and 5-9 by the respective reference numerals 122a and 122b. The press assemblies 122a and 122b are identical in construction (mirror images) and operation and a typical press assembly 122a or 122b is shown in FIGS. 5-9. Each press assembly 122 is adapted to automatically manufacture end plates 12 and to automatically connect the formed end plates 12 to the ends 110 or 112 of the railroad ties 14.

The press assembly 122a more particularly is constructed and adapted to manufacture and connect end plates 12 to the first end 110 of the railroad ties 14. The press assembly 122b more particularly is adapted to manufacture and connect end plate 12 to the second end 112 of the railroad ties 14.

The press assemblies 122 are disposed on opposite sides of the main conveyor 18 and on opposite sides of the speed-up conveyor 44. The press assemblies 122 are disposed between the entry end 20 and the exit end 22 of the main conveyor 18 and the press assemblies 122 are disposed at a plate assembly position 124 (FIGS. 1 and 2).

The apparatus 10 includes a pair of coil turntables 126 (FIGS. 1 and 2). The coil turntables 126 are identical in construction and operation and the coil turntable associated with the press assembly 122a is designated 126a in FIG. 1 and the coil turntable 126 associated with the press assembly 122b is designated with the reference numeral 126b in FIG. 1.

Each of the coil turntables 126 supports a coil of a web of material 128 (the web of material 128 associated with the coil turntable 126a being designated in FIG. 1 by the reference numeral 128a and the web of material 128 associated with the coil turntable 126b being designated in FIG. 1 by the reference numeral 128b). The web of material 128 more particularly is a web of sheet steel.

The webs of material 128 are supported on the respective turntables 126. A portion of each of the webs of material 128 extends a distance from the respective coil turntables 126 terminating with a lead end 130 (the lead end of the web of material 128 being designated by the numeral 130a in FIG. 1 and the lead end of the web of material 128b being designated by the numeral 130b in FIG. 1. The lead end 130a is operatively disposed in the press assembly 122a and the lead end 130b is operatively disposed in the press assembly 122b.

Each web of material 128 has a first side 132 and a second side 134, as shown in FIG. 2 with respect to the web of material 128a. A height of the web of material 128 extends between the sides 132 and 134 of the web of material 128. In one embodiment, the height of each web of material 128 is about six inches.

The apparatus 10 includes a pair of clamp assemblies 136. One of the clamp assemblies 136 is disposed at the end plate assembly position 124 and associated with the press assembly 122a and this clamp assembly is designated in FIG. 1 with the reference numeral 136a. The other clamp assembly 136 is disposed at the end plate assembly position 124 and associated with the press assembly 122b and this clamp assembly 136 is designated in FIG. 1 with the reference numeral 136b. The clamp assemblies 136 are identical in construction and operation.

As shown more clearly in FIG. 12, each clamp assembly 136 includes a top clamp cylinder 138 (designated "Top Clamp" in FIGS. 18B), a first side clamp cylinder 140 (designated "Register Clamp" in FIGS. 18B), a second side clamp cylinder 142 (designated "Side Clamp" in FIGS. 18B) and a frame clamp plate 144. The frame clamp plates 144 are formed on the press frame 155 at a position slightly above the conveying surface 42 of the main conveyor 18 so that the main conveyor 18 can continue to be operated while the ends 110 and 112 of the railroad tie 14 are clampingly secured in the clamp assemblies 136. The frame clamp plates 144 are supported so that the frame clamp plates 144 are positioned in a plane disposed a distance below the planer disposition of the conveying surface 78 of the speed-up conveyor 44 when the speed-up conveyor 44 is in the raised position and the frame clamp plates 144 are disposed in a plane spaced a distance above the planer disposition of the conveying surface 78 of the speed-up conveyor 44 in the lowered position of the speed-up conveyor 44 for cooperating to position the railroad tie 14 in the end plate assembly position 124 in a manner which will be described in greater detail below. Each of the clamp assemblies 136 is adapted to stop and position one of the railroad ties 14 at the end plate assembly position 124 and to compressingly clamp the first and the second sides 114 and 116 and the upper and the lower surfaces 118 and 120 at the respective first and second ends 110 and 112 of the railroad tie 14 positioned at the end plate assembly position 124.

An end plate assembly position sensor 146 is supported at the end plate assembly position 124 (FIG. 2). The end plate assembly position sensor 146 is adapted to sense the presence of a railroad tie 14 at the end plate assembly position 124 and to output a signal indicating that a railroad tie 14 has been position at the end plate assembly position 124 or has been removed therefrom. The end plate assembly position sensor 146 preferably is a photoelectric type of sensor.

As shown more clearly in FIGS. 5-9, each press assembly 122 includes an indexing drive assembly 150. Each indexing drive assembly 150 includes a pair of drive rollers 152 and 154 rotatingly supported on a frame 155. The drive rollers 152 and 154 are spaced a distance apart and adapted to receive the lead end 130 of the web of material 128 and to drivingly engage the web of material 128 disposed therebetween. An indexing motor 156 (FIG. 5) is connected to one of the drive rollers 154 for drivingly rotating the drive roller 154 in a driven condition of the indexing motor 156. In a driven condition of the drive rollers 152 and 154, the drive rollers 152 and 154 drivingly move the web of material 128 in a direction 158 (FIG. 5) to index the webs of material 128 through the respective press assemblies 122, in a manner and for reasons which will be described in greater detail below.

It should be noted that the coil turntables 126 are motor driven and the motors are connected to the control assembly 230 (described below). The coil turntables 126 are automatically operated to maintain a loop of material ahead of each of the indexing drive assemblies 150 to reduce the amount of material actually pulled or pushed by the indexing drive assemblies 150.

Each press assembly 122 includes a die set assembly 160. Each die set assembly 160 is adapted to punch the holes and form the nail members in one of the webs of material 128 to cooperate in forming the end plates 12. More particularly, each die set assembly includes two rows of punches 162 operative connected to a pressing cylinder 164. The punches 162 are extended to punch the two rows of holes in the web of material in an actuated position of the pressing cylinder 164.

Each die set assembly 160 also includes a hold down piston 166 (FIGS. 13 and 14). The hold down piston 166 is extended to engage the web of material 128 disposed in the die set assembly 160 when the pressing cylinder 164 is actuated to hold the web of material 128 in the die set assembly 160 during the punching operation.

Each die set assembly 160 also includes corner punches 168 (FIGS. 13 and 14). The corner punches 168 are extendible when the last pair of rows of holes are punched in the end plate 12 being made for cutting or shearing the last round corners of the end plate 12 being made in the die set assembly 160 and simultaneously punching the first round corners of the next end plate 12 to be made in the die set assembly 160.

As shown in FIGS. 13 and 14, each die set assembly 160 has a die plate 170 which is fixed or fastened to the frame of the die set assembly 160. Each die set assembly 160 also includes a press plate 172 and an extractor plate 174. Each die set assembly 160 also includes a punch holder plate 176, a seal plate 178, a piston plate 180 and a top plate 182. The punch holder plate 176, the seal plate 178, the piston plate 180 and the top plate 182 are bolted together and moved in unison.

Figure 10:
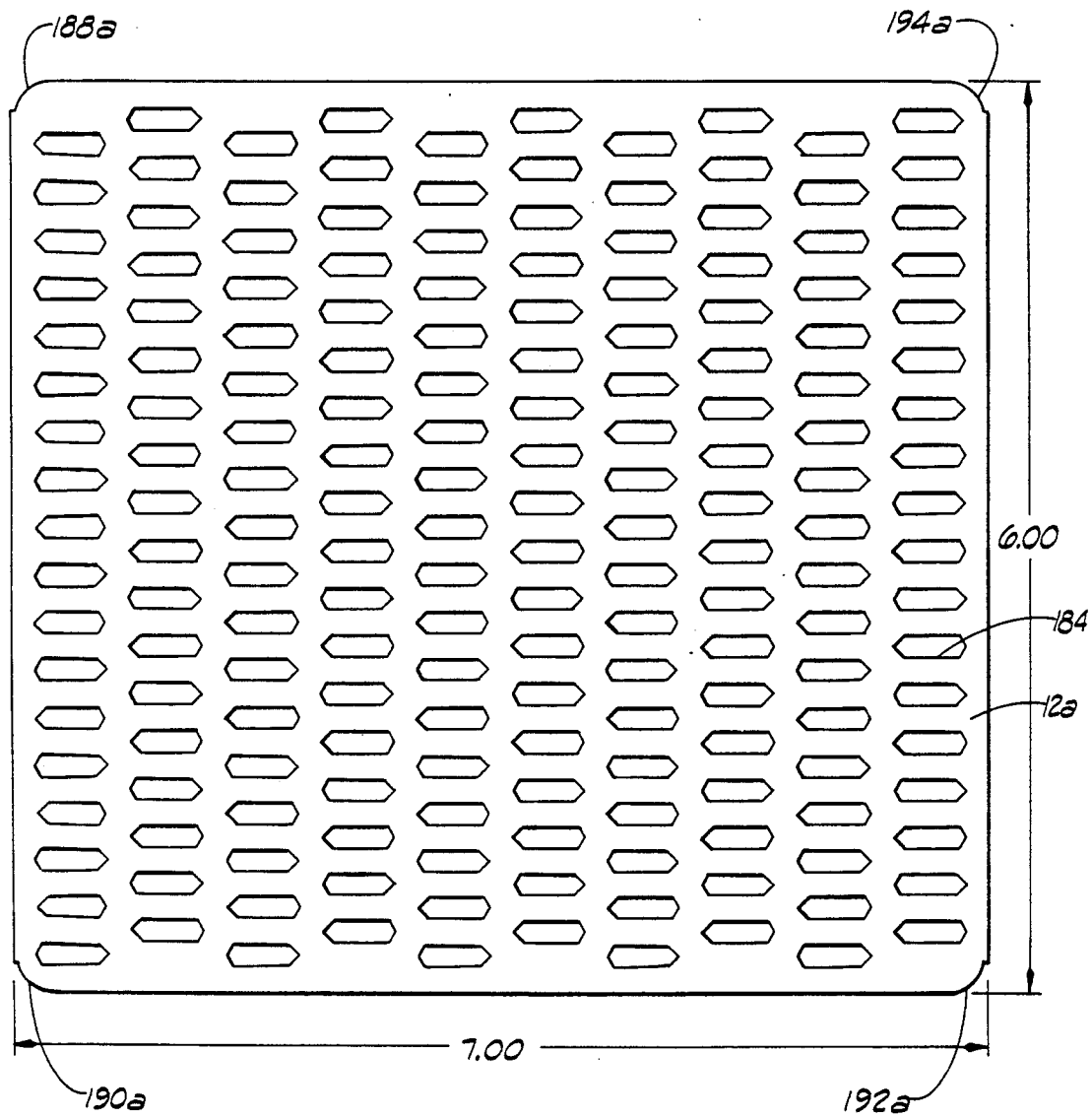
FIG. 10 is a top plan view of a typical second size of end plate constructed using the press assembly of the present invention.
Figure 11:
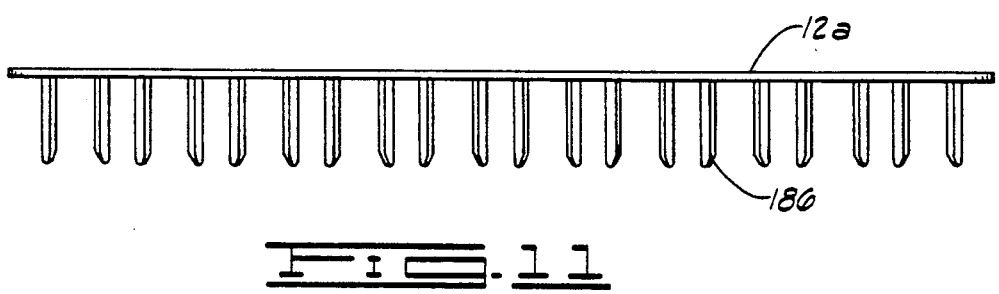
FIG. 11 is a side elevational view of the end plate of FIG. 10.
Figure 10A:
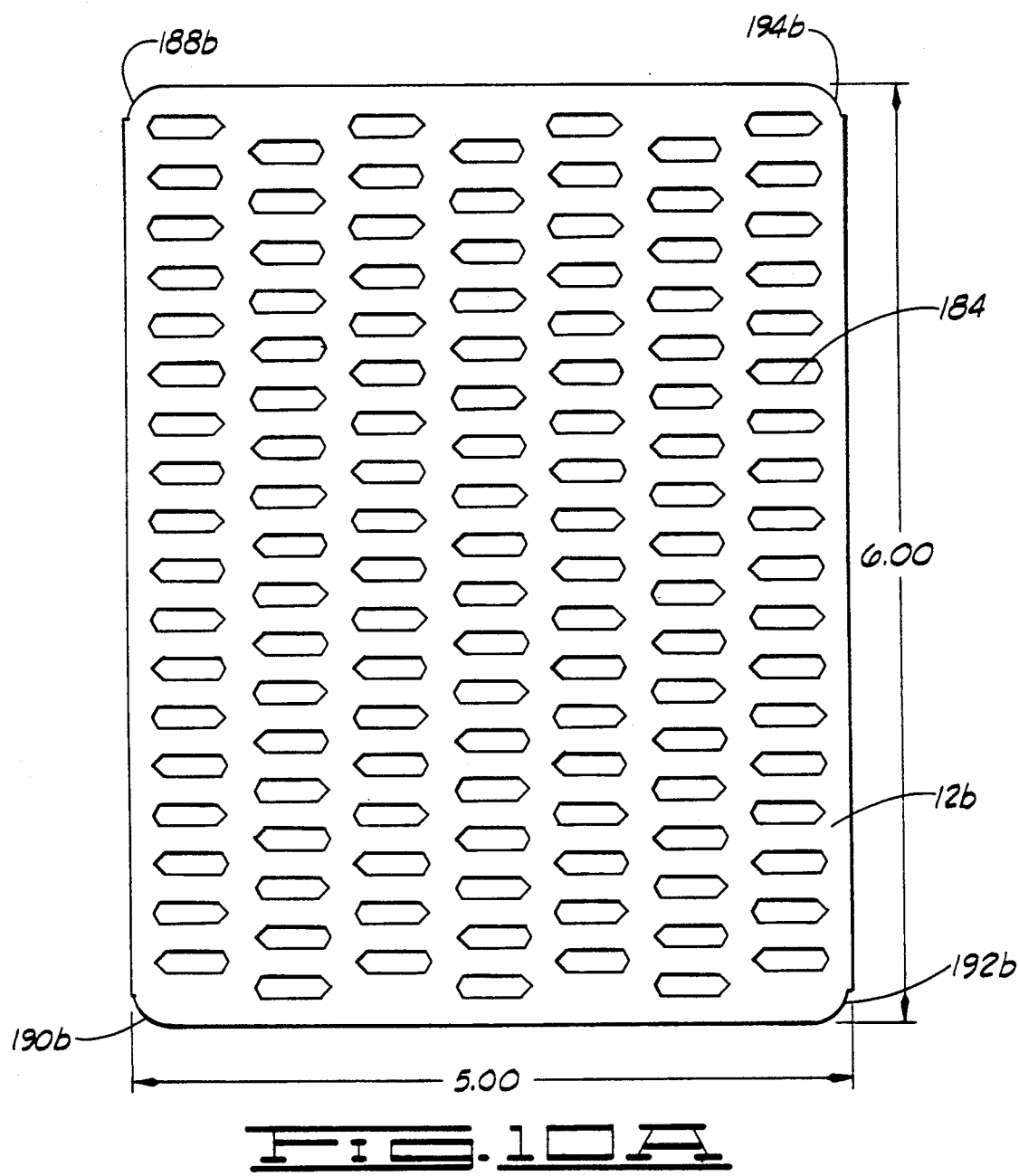
FIG. 10A is a top plan view of a typical first size of end plate constructed using the press assembly of the present invention.
Figure 11A:
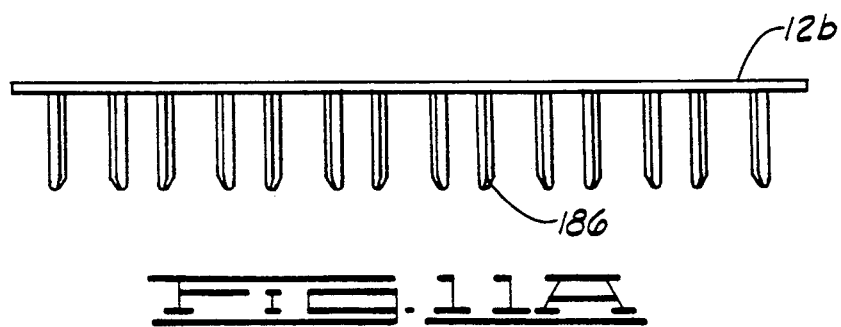
FIG. 11A is a side elevational view of the end plate of FIG. 10A.

As mentioned before, the press assemblies 122 each are adapted to produce two different sizes of end plates 12. Shown in FIGS. 10 and 11 is a typical six inch by seven inch second size end plate 12a. The second size end plate 12a is connected to railroad ties having a width of about nine inches and a height of about seven inches. Shown in FIGS. 10A and 11A is a typical five inch by six inch first size end plate 12b. The first size end plate 12b is connected to railroad ties having width of about eight inches and a height of about six inches. In each case, the six inch dimension corresponds to the height of the web of material 128 between the first and the second sides 132 and 134.

Each of the end plates 12a and 12b includes a plurality of openings 184 (only one of the openings 184 being designated with the reference numeral in FIGS. 10 and 10A). The openings 184 are formed in such a manner that the metal removed from each of the openings 184 remains attached to the end plate 12 to form a plurality of nail members 186 extending from one surface of the end plate 12 (only one of the nail members 186 being designated with a reference numeral in FIGS. 11 and 11A).

The die set assembly 160, as mentioned, is adapted to punch two rows of the openings 184 in the end plate being constructed during each cycle. The web of material 128 then is advanced and a second pair rows of openings 184 are punched in the web of material 128. This process is continued until the required number of pairs of rows of openings 184 are punched in the end plate 12.

Each of the end plates 12a and 12b has rounded corners 188, 190, 192 and 194. As mentioned before, the die set assembly 160 also is adapted to punch the last round corners (192 and 194) of the end plate presently being made while simultaneously punching the first round corners (188 and 190) of the next end plate to be made by the die set assembly 160.

Figure 15:
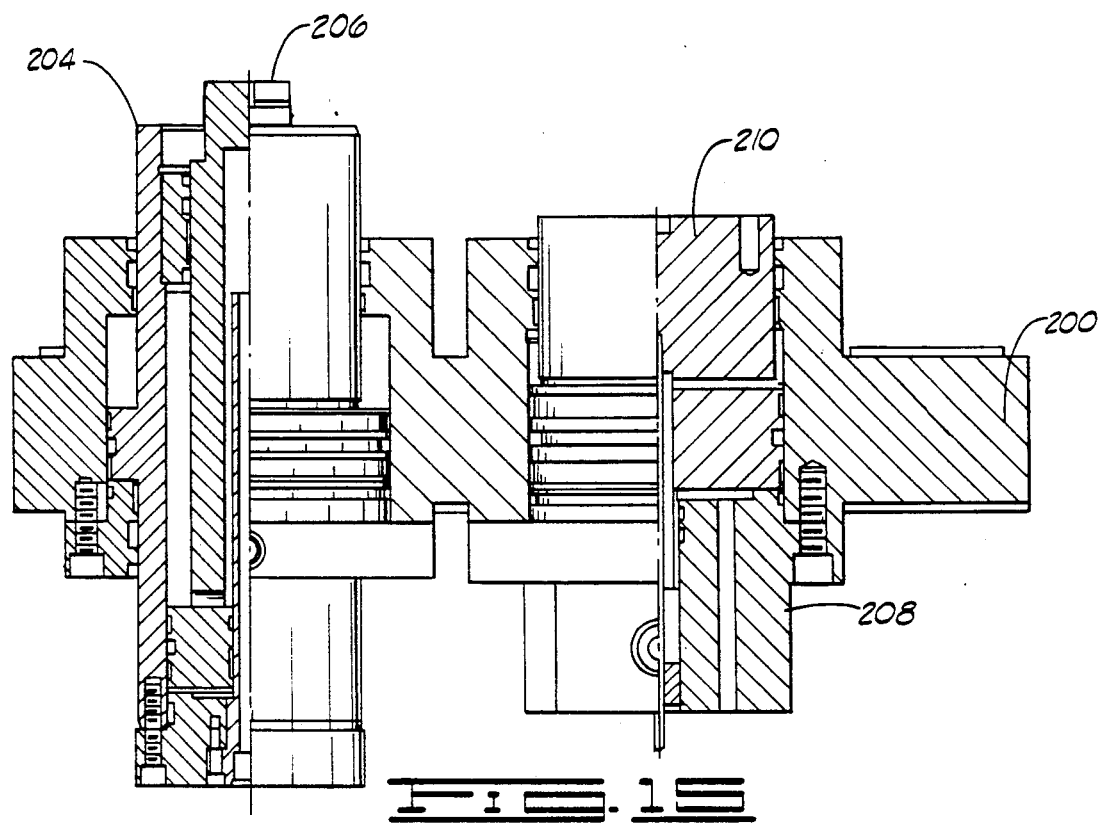
FIG. 15 is a sectional view of the press head assembly portion of the press assembly of the present invention.

As shown more clearly in FIGS. 5-9, each press assembly 122 also includes a press head assembly 196. Each press head assembly 196 includes a compound press cylinder 198 connected to a press head 200. The press head 200 includes a shear blade 202. The press head 200 contains the shear blade 202 which is attached to a compound shear piston 204 and press piston 206 with the shear piston 204 and press piston 206 comprising portions of the press cylinder 198. The shear head press hydraulic piston assembly (press cylinder 198) shown in greater detail in FIGS. 15 and 16. This assembly includes a press cylinder head 208 and a piston 210. The shear piston 204 is extended cutting off the lead end of the web of material 128 leaving an initial end, freshly sheared and with the lead round corners.

Figure 17:
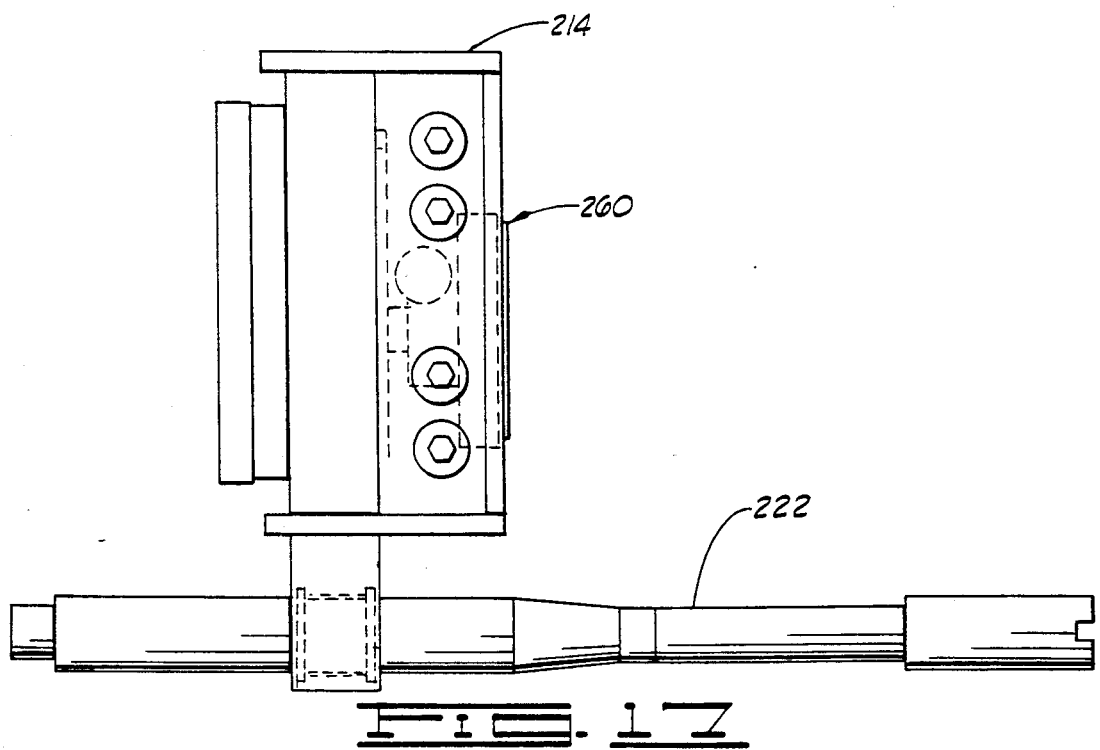
FIG. 17 is a side elevational view showing the press head of FIG. 16 in an assembled position.
Figure 15:
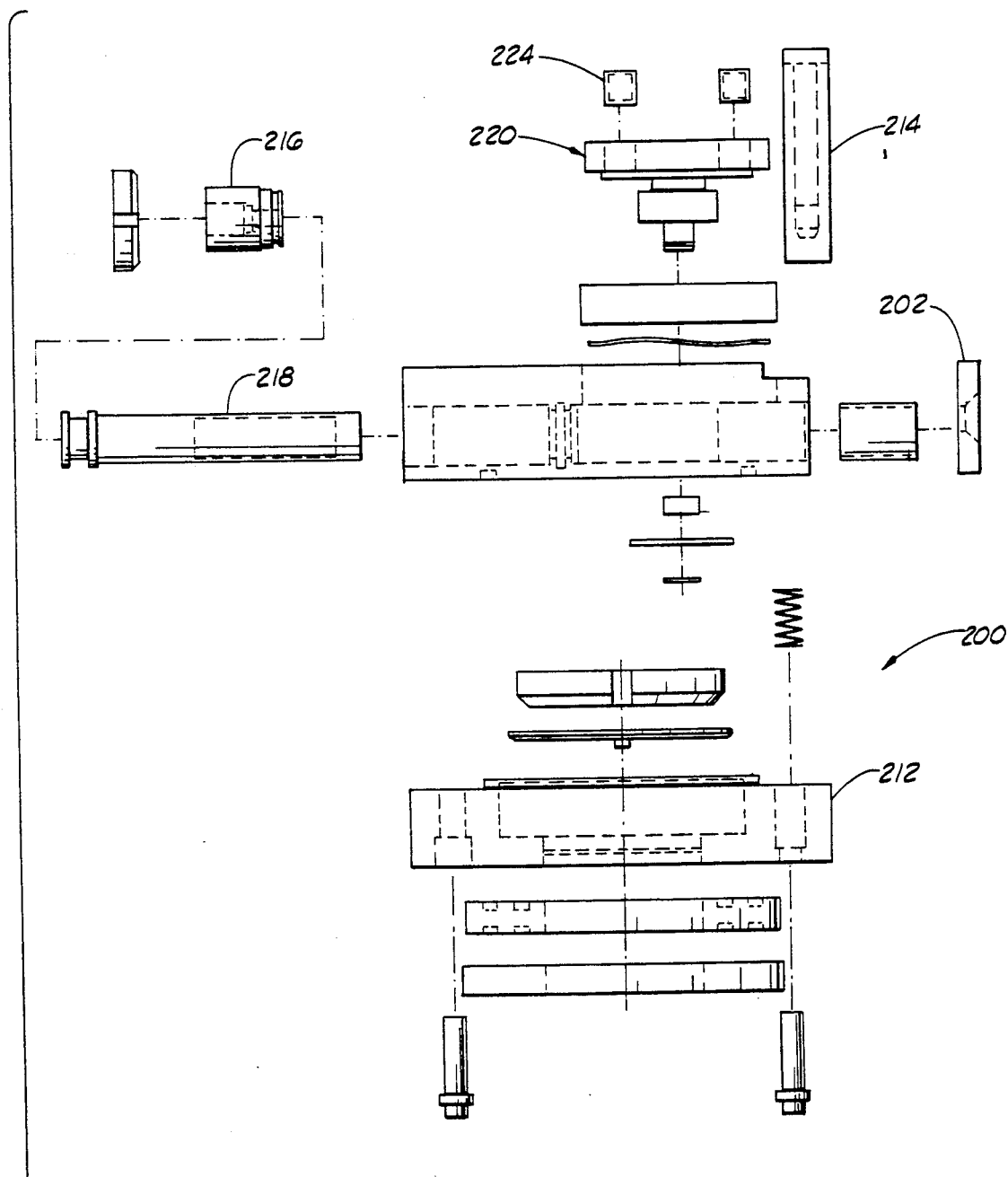

The details of the press head 200 are shown more clearly in FIGS. 16 and 17. The press head 200 includes base plate 212, a right hand kicker 214, a piston plug 216, a piston 218, rotor gear assembly 220, a guide rod 222, the shear blade 202 and permanent magnets 224 mounted on the rotor gear assembly 220. The magnets 224 magnetically hold the formed end plate 12 on the press head 200 after it has been sheared from the web of material 128. The shear piston 204 is retracted and the kicker 214 on the press head 200 is extended by contact with the frame for kicking the sheared off piece from the magnets 224, the sheared off piece being permitted to fall from the press head assembly 196.

The apparatus 10 also includes a control assembly 230 (FIG. 2). In one form, the control assembly 230 may be a microprocessor based control system. The control assembly 230 comprises a plurality of pneumatic and hydraulic lines, electrical conductors, pneumatic and hydraulic control valves and various other components required to effect the control of the apparatus 10 in the manner described herein. Various configurations of control systems are suitable for controlling the apparatus 10 and the construction and the operation including the details of the various components will be apparent to those skilled in the art from the detailed description of the operation of the apparatus 10 described herein.

The conveyor motor 38 is connected to the control assembly 230 as indicated in FIG. 1. The conveyor motor 74 is connected to the control assembly 230 as indicated in FIG. 1. The escapement cylinders 56 and 58 each are connected to the control assembly 230 as indicated in FIG. 2 with respect to the escapement cylinder 58. The centering cylinders 102 and 104 each are connected to the control assembly 230 as indicated in FIG. 1. The initial feed position sensor 106 is connected to the control assembly 230 as indicated in FIG. 2. The sizing sensor 108 is connected to the control assembly 230 as indicated in FIG. 1. Each press assembly 122 is connected to the control assembly 230 as indicated in FIG. 2 with respect to the press assembly 122a. Each top clamp cylinder 138 is connected to the control assembly 230. Each first side clamp cylinder 140 is connected to the control assembly 230. Each side clamp cylinder 142 is connected to the control assembly 230 as indicated in FIG. 12. The end plate assembly position sensor 146 is connected to the control assembly 230 as indicated in FIG. 2. The indexing motor 156 is connected to the control assembly 230 as indicated in FIG. 5. The control assembly 230 is adapted to control the operation of the apparatus 10 for automatically producing the end plates 12 and automatically connecting the end plates 12 to the ends 110 and 112 of the railroad ties 14 in a manner generally indicated in the flow diagram shown in FIG. 18 and in the manner to be described in greater detail below.

OPERATION

Figures 18A, 18B:
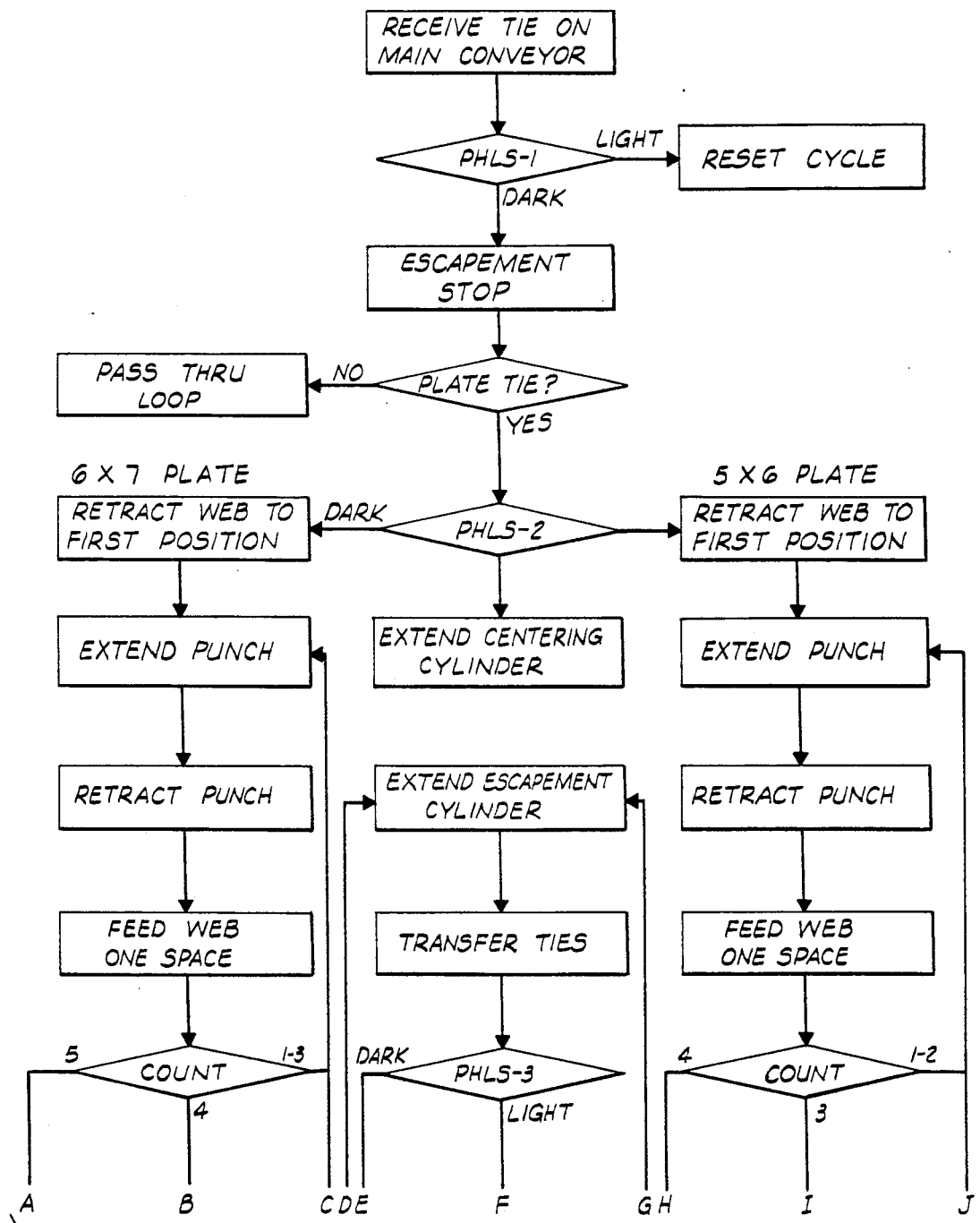
FIGS. 18A, and 18B show a process flow chart illustrating the operation of the present invention for manufacturing end plates and connecting the end plates to the ends of railroad ties.

The operation of the apparatus 10 is diagrammatically illustrated in FIGS. 18A and 18B. The diagrams shown in FIGS. 18A and 18B are intended to be a single continuous diagram.

When it is desired to operate the apparatus 10, the control assembly 230 is activated and the control assembly 230 activates the conveyor motor 38 for driving the main conveyor 18. Further, the conveyor 74 is activated for drivingly moving the speed-up conveyor 44.

The control assembly 230 actuates the escapement cylinders 56 and 58 to lower the cylinder rods and position the escapement stops 86 and 88 in the stop position and to position the speed-up conveyor 44 in the lowered position (shown in FIG. 3). The control assembly 230 also actuates each of the first side clamp cylinders 140, each of the second side clamp cylinders 142 and each of the top clamp cylinders 138 for moving the respective cylinder rods thereof to retracted positions.

The operator positions the lead end 130 of each web of material 128 in the indexing drive assembly 150 of the respective press assemblies 122. The webs of material 128 are advanced by the indexing motors 156 to position each of the lead ends 130 in the respective die set assemblies 160 in an initial or start position. Assuming an end plate 12 previously has been formed by the press assemblies 122, the indexing motors 156 each are activated to drive indexing drive assemblies 150 for indexing or moving the respective webs of material 128 in a direction opposite the direction 158, thereby retracting each of the webs of material 128 and positioning each of the webs of material 128 in an initial or first position in the respective die set assemblies 160.

The railroad ties 14 are stacked on the main conveyor 18 at the entry end 20 thereof in sequentially as the main conveyor 36 moves the railroad ties 14 in the direction 40 toward the exit end 22 of the main conveyor 18. The railroad ties 14 are moved by the main conveyor 18 in the direction 40 to sequentially move each of the railroad ties 14 into the initial feed position 100. When one of the railroad ties 14 is moved into the initial feed position 100, the presence of that railroad tie 14 is sensed (dark) by the initial feed position sensor 106 which outputs a signal to the control assembly 230. Further, in the initial feed position 100 of the railroad tie 14, the sizing sensor 108 senses the size of the railroad tie and outputs a signal to the control assembly 230 indicating the sensed size of the railroad tie 14 located at the initial feed position 100 (light indicating the first size of railroad tie having a height of six inches and dark or no-light indicating the second size of railroad tie having a height of seven inches). Initially, it will be assumed that the sizing sensor 108 has sensed a railroad tie 14 of a second size of nine inches wide by seven inches high requiring a second size end plate seven inches wide times six inches high, FIGS. 10-11.

When one of the railroad ties 14 is moved into the initial feed position, this railroad tie 14 will be engaged by the stop surfaces 92 of the escapements stops 86 and 88 which cooperate to position the leading railroad tie 14 in the initial feed position 100. In response to receiving a signal from the initial feed position sensor 106 indicating the railroad tie 14 is positioned in the initial feed position 100, the control assembly 230 actuates the centering cylinders 102 and 104. When activated or actuated, the centering cylinders 102 and 104 each extend the respective cylinder rods thereof to engage the respective ends 110 and 112 of the railroad tie 14 in the initial feed position 100 to center the railroad tie 14 on the main conveyor 18 in a proper, predetermined position at this initial feed position 100. After centering, the control assembly 230 actuates the centering cylinder 102 and 104 to retract the respective cylinder rods thereof.

With one of the railroad ties 14 positioned at the initial feed position 100, the control assembly 230 actuates the die set assemblies causing the punches 162 to be extended for punching the two rows of openings 184 in the end plate 12 to be made for the railroad tie 14 positioned at the initial feed position 100. The punches 162 then are retracted and the control assembly 230 activates the indexing motors 156 for driving the rollers 152 and 154 indexing or moving the webs of material 128 an increment in the direction 158 to position the webs of material 128 for the punching of the next two rows of openings 184. After indexing, the control assembly 230 activates the die set assemblies 160 to again extend the punches 162 and punch a second set of two rows in the webs of material 128. The webs of material 128 are indexed and the two rows of openings 184 are punched in the webs of material 128 until the required number of rows of openings 184 have been punched in each of the webs of material 128 as determined by the size of the end plate 12 to be made as indicated by the signal from the sizing sensor 108. Before the last set of holes is punched in each of the end plates, the corner punches 168 are extended, whereby shearing the last round corners of the present end plate 12 and the first round corners of the next end plate 12 when the last set of holes is punched. The corner punches 168 then are retracted.

In response to the corner punches 168 being retracted, the control assembly 230 causes the escapement cylinders 56 and 58 to be extended thereby raising the speed-up conveyor 44 to the raised position and pivotally moving the escapement stops 86 and 88 to the release position (FIG. 4). As the speed-up conveyor 44 is raised, the railroad tie 14 positioned in the initial feed position 100 is lifted onto the conveying surface 78 of the speed-up conveyor 44 and the stops 94 and 96 on the speed-up conveyor 44 are positioned to engage and stop the next incoming railroad tie 14, as indicated in FIG. 4.

When the speed-up conveyor 44 is moved to the raised position, the control assembly 230 actuates the first side clamp cylinders 140 to cause the cylinder rods to be extended to a position wherein clamp plates on the cylinder rods of the first side clamp cylinders 140 are disposed over a portion of the conveying surface 78 of the speed-up conveyor 44. The speed-up conveyor 44 moves the railroad tie 14 disposed thereon in the direction 76 until the railroad tie 14 engages the clamp plates on the first side clamp cylinders 140, the engagement of the railroad tie 14 with the clamp plates on the first side clamp cylinders 140 cooperating to position the railroad tie 14 in the end plate assembly position 124.

When the railroad tie 14 has been positioned in the end plate assembly position 124, the control assembly 230 actuates the escapement cylinders 56 and 58 causing the escapement cylinders 56 and 58 to be retracted thereby lowering the speed-up conveyor 44. As the speed-up conveyor 44 is lowered, the stops 94 and 96 on the speed-up conveyor 44 are disengaged from the leading railroad tie 14 on the main conveyor 18 and the escapement stops 86 and 88 each are pivoted to the stop position wherein the stop surface 92 thereof are positioned to engage the next incoming railroad tie 14 on the main conveyor 18.

As the speed-up conveyor 44 is lowered, the railroad tie 14 positioned at the end plate assembly position 124 is lowered onto the frame clamp plates 144 since the frame clamp plates 144 are positioned in a plane generally above the planar disposition of conveying surface 78 when the speed-up conveyor 44 is in the lowered position. In this position, the railroad tie 14 located at the end plate assembly position is supported on the frame clamp plates 144 a distance generally above the conveying surface 78 of the speed-up conveyor 44. After the railroad tie positioned at the end plate assembly position 124 has been supported on the frame clamp plates 144, the control assembly 230 actuates the top clamp cylinders 138 and the second side clamp cylinders 142 so that the cylinder rods thereof are extended to engage the railroad tie 14 supported on the frame clamp plates 144. The clamp plates on each of the first side clamp cylinders 140 each engage the first side 114 of the railroad tie 14, the clamp plates on the second side clamp cylinders 142 each engage the second side 116 of the railroad tie 14 and the clamp plates on the cylinder rods of the top clamp cylinders 138 each engage the upper surface 118 of the railroad tie 14 in the extended position of the cylinders 138 and 140 and 142. The frame clamp plates 144 engage the lower surface 120 of the railroad tie 14. Thus, the cylinders 138 and 140 and 142 and the frame clamp plate 144 of each of the clamp assemblies 136 engages the first and second sides 114 and 116 and the upper and the lower surfaces 118 and 120 of the railroad tie 14 positioned at the end plate assembly position 124 to compress the railroad tie 14 generally at the respective first and second ends 110 and 112 thereof.

Figure 7:
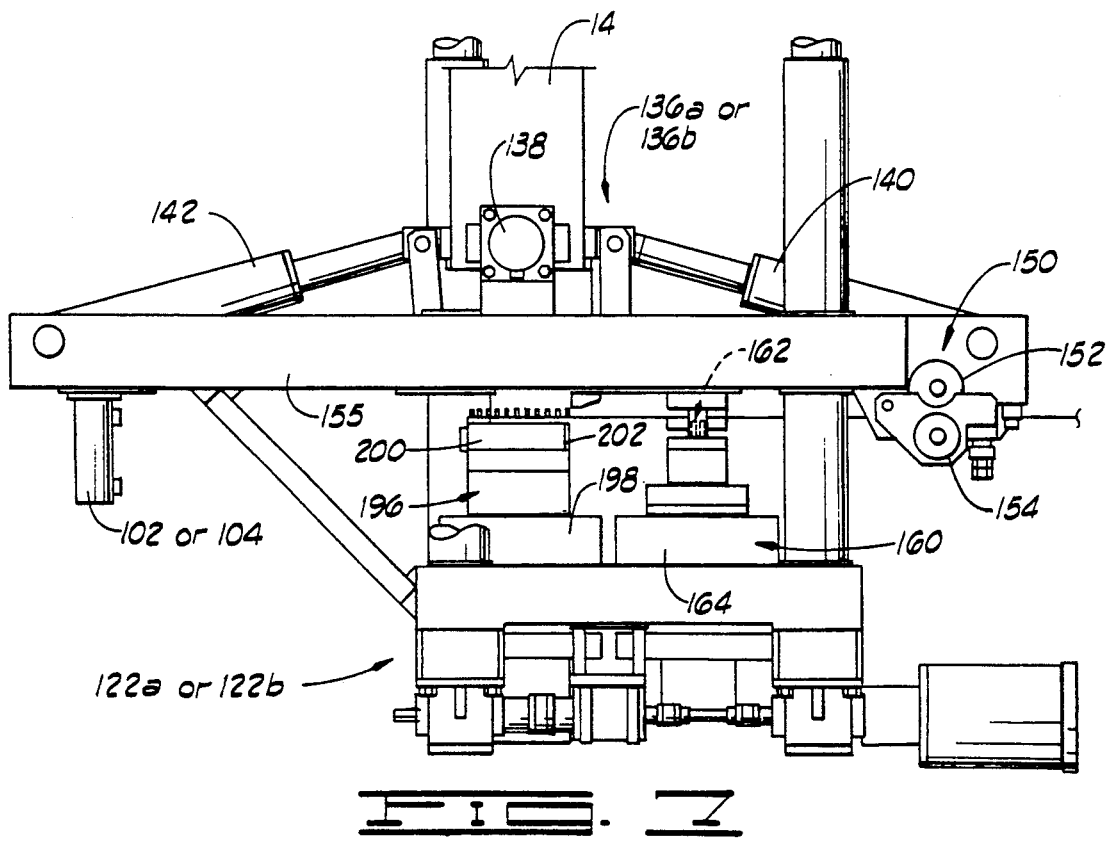
FIG. 7 is a view of the press assembly, similar to FIGS. 5 and 6, but showing the die set assembly in the retracted position with the web of material indexed or moved into the press head assembly prior to cutting the formed end plate from the web of material.
Figure 8:
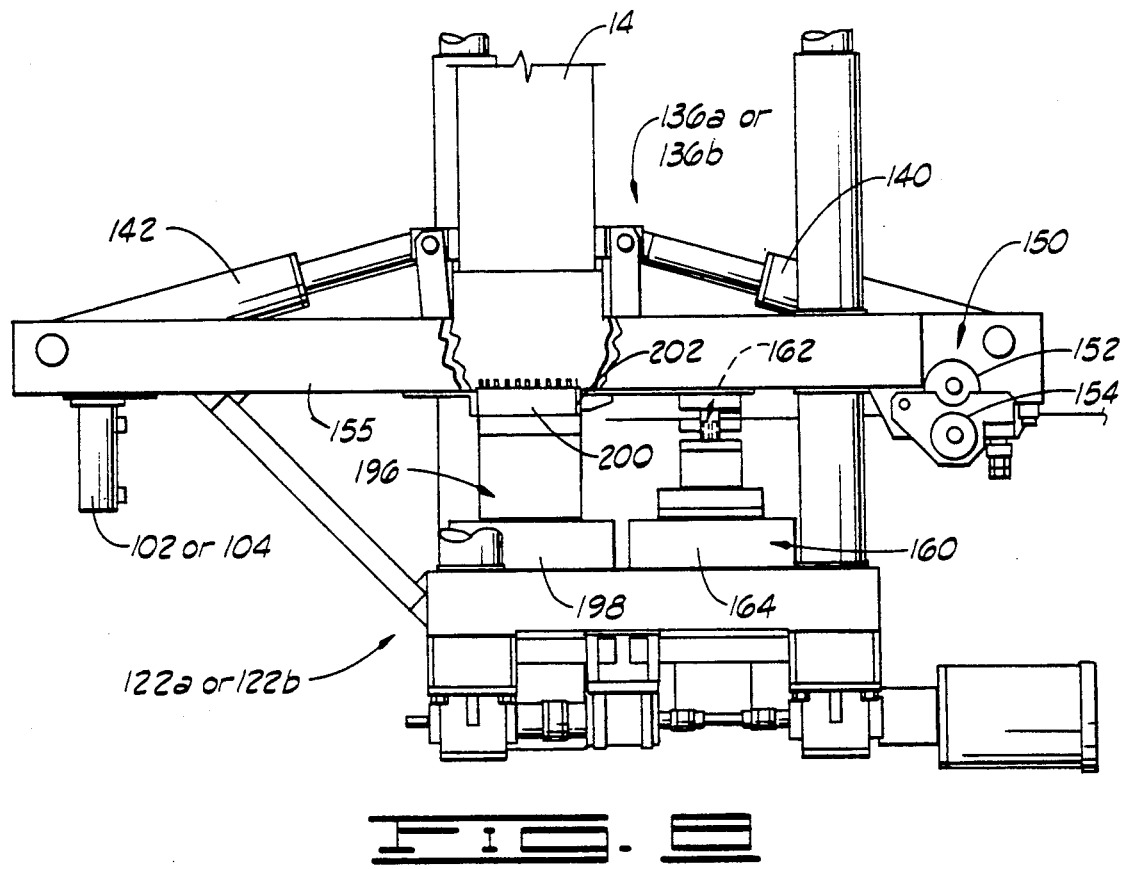
FIG. 8 is a view of the press assembly, similar to FIGS. 5, 6 and 7, but showing the end plate on the press head assembly after end plate has been sheared or cut from the web of material.
Figure 9:
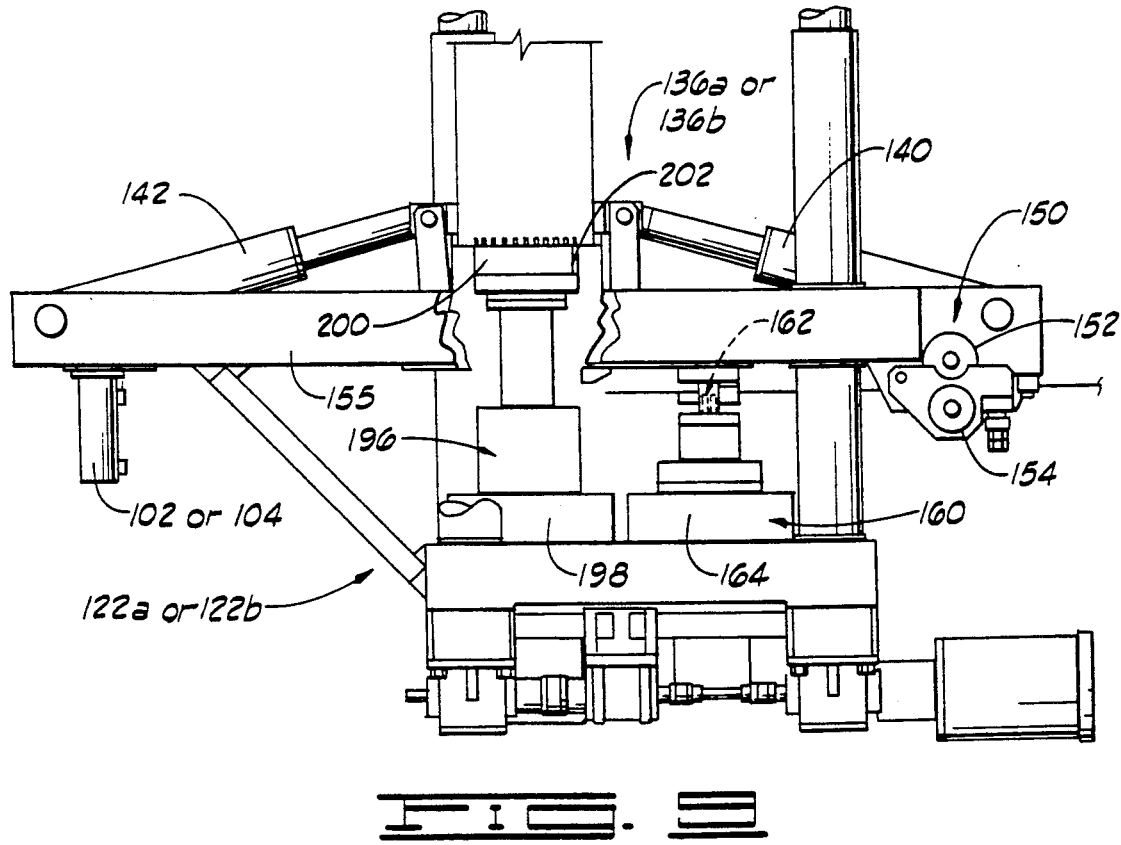
FIG. 9 is a view of the press assembly, similar to FIGS. 5, 6, 7 and 8, but showing the press head assembly with the end plate connected thereto extended for connecting the end plate on a typical end of the railroad tie.

While the railroad tie is being moved by the speed-up conveyor 44 to the end plate assembly position 124, the control assembly 230 continues to control the press assemblies 122 for manufacturing the end plates 12. The control assembly 230 actuates the indexing motors 156 to move the webs of material 128 in the direction 158 to position the portion of each of the webs of material 128 having the openings 184 punched therein generally in the press head assembly 196, as shown in FIG. 7. After the web of material 128 have been positioned in the press head assemblies 196 and after the clamp assemblies 136 have been actuated to compressingly clamp the respective ends 110 and 112 of the railroad tie 14 positioned at the end plate assembly position 124, the control assembly 230 actuates the press head assembly 196 causing the press head 200 with the shear blade 202 connected thereto to be extended cutting off a portion of each of the webs of material 128 thereby severing the completed end plates 12 from the webs of material. The magnets 224 on the press heads 200 hold the completed end plates 12 on the press heads 200. The webs of material 128 then are retracted by the indexing drive assemblies 150 to the initial punch position in the die set assemblies 160.

In this position, the end plates 12 are connected to the press heads 200 by way of the permanent magnets 224. As soon as the clamp assemblies 136 have clamped the respective ends 110 and 112 of the railroad tie 14 positioned at the end plate assembly position 124, the press pistons 206 are actuated by the control assembly 230 and extended pressing the end plates 12 into the respective ends 110 and 112 of the railroad tie 14.

After the end plates 12 have been driven into the respective ends 110 and 112 of the railroad tie, the control assembly 230 actuates the clamp assemblies 136 to retract the respective cylinders 138, 140 and 142. Assuming another railroad tie 14 is positioned in the initial feed position 100, the speed-up conveyor 44 is moved to the raised position in the manner described before thereby lifting the railroad tie 14 from the frame clamp plates 144 and disposing the railroad tie 14 with the end plates 12 connected thereto again on the conveying surface 78 of the speed-up conveyor 44. The railroad tie 14 with the end plates 12 connected thereto is moved on the speed-up conveyor 44 in the direction 76 toward the exit end 50 of the speed-up conveyor 44 where the railroad tie 14 with the end plates 12 connected thereto is discharged from the speed-up conveyor 44 onto the main conveyor 18 where the railroad tie 14 then is moved to a discharge position. As the railroad tie 14 with the end plates 12 connected thereto is moved by the speed-up conveyor 44 back onto the main conveyor 18, another railroad tie 14 has been positioned on the speed-up conveyor 44 at the entry end 48 thereof for movement toward the end plate assembly position 124 for connecting end plates 12 to the next railroad tie 14.

This process is repeated until end plates 14 have been attached to the ends 110 and 112 of all of the railroad ties 14 where desired. In some instances, there may be railroad ties 14 going through the system where it is not desired to attach end plates 12. In these instances, the control assembly 230 is positioned to bypass those particular railroad ties 14 and those particular railroad ties 14 are merely moved over the speed-up conveyor 44 and back onto the main conveyor 18 without being stopped at the end plate assembly position 124.

The foregoing operation has been described with respect to second size of end plates 12 having a width of nine inches and a height of seven inches. In these instances, the end plates 12 merely are cut from the lead ends 130 of the webs of material 128 at a position about seven inches from the lead end 130. When the sizing sensor 108 senses a railroad tie 14 having a first size of eight inches wide by six inches high requiring a first size end plate 12 six inches wide and five inches high, the sizing sensor 108 outputs a signal to the control assembly 230 indicating this different size of railroad tie 14 is positioned at the initial feed position. The control assembly 230 is adapted to actuate the various components of the apparatus 10 in the manner described before, except the die set assemblies 160 are actuated to punch a different number of sets of rows of openings 184 in the webs of material 128 so that the openings extend over the five inch distance and the press head assemblies 196 and the indexing drive assemblies 150 are actuated by the control assembly 230 to cut the completed end plates 12 from the webs of material 128 at a position about five inches from the lead ends 130 of the respective webs of material 128. When cut, the completed end plate 12 attached to the respective press heads 200 by way of the permanent magnets 224 are ninety degrees out of phase with respect to the railroad tie 14 located at the end plate assembly position 124. In this instance, the control assembly 230 actuates the press head assemblies 196 so that the rotator gear assembly 220 rotates each of the end plates 12 attached to the respective press heads 200 ninety degrees. After rotation, the end plates 12 then are attached to the respective ends 110 and 112 of the railroad tie 14.

Changes may be made in the construction and the operation of the various components, assemblies and elements described herein and changes may be made in the steps or the sequence of steps of the methods described herein without departing from the spirit and the scope of the invention as defined in the following claims.

What is claimed is:

1. A method for automatically manufacturing end plates and connecting one of the end plates to railroad ties wherein each railroad tie has a first side, a second side, an upper surface, a lower surface, a first end and a second end, comprising the steps:
    moving sequentially a plurality of railroad ties to an end plate assembly position;
    manufacturing end plates at the end plate assembly position;
    connecting automatically one of the end plates to the first end of each of the railroad ties after the railroad tie has been moved to the end plate assembly position, comprising:
    (a) feeding a web of material having a lead end to position a portion of the web of material near the lead end thereof at the end plate assembly position;
    (b) forming nail members on a portion of the web of material near the lead end thereof;
    (c) cutting the web of material at a position spaced a distance from the lead end thereof to provide the end plate having the nail members formed thereon; and
    (d) connecting the end plate to the first end of the railroad tie via the nail members on the end plate; and
    moving each of the railroad ties with the end plate connected thereto from the end plate assembly position to a discharge position.

2. The method of claim 1 wherein, prior to the step of connecting the end plate to the railroad tie, the method further comprises:
    engaging the first and the second sides and the upper and the lower surfaces of the railroad tie near the first end of the railroad tie positioned at the end plate assembly position for compressing portions of the railroad tie near the first end of the railroad tie prior to connecting the end plate to the first end of the railroad tie and maintaining said engaging during the connecting of the end plate to the railroad tie positioned at the end plate assembly position; and
    releasing the engagement of the first and the second sides and the upper and the lower surfaces of the railroad tie after connecting the end plate to the first end of the railroad tie positioned at the end plate assembly position and prior to moving the railroad tie with the end plate connected thereto from the end plate assembly position to the discharge position.

3. The method of claim 1 wherein, prior to the step of connecting the end plate to the railroad tie at the end plate assembly position, the method further comprises:
    sensing the railroad tie has been moved to the end plate assembly position;
    engaging, in response to sensing the railroad tie has been moved to the end plate assembly position, the first and the second sides and the upper and the lower surfaces of the railroad tie near the first end of the railroad tie positioned at the end plate assembly position for compressing portions of the railroad tie near the first end of the railroad tie prior to connecting the end plate to the first end of the railroad tie and maintaining said engaging during the connecting of the end plate to the railroad tie positioned at the end plate assembly position; and
    releasing the engagement of the first and the second sides and the upper and the lower surfaces of the railroad tie after connecting the end plate to the first end of the railroad tie positioned at the end plate assembly position and prior to moving the railroad tie with the end plate connected thereto from the end plate assembly position to the discharge position.

4. A method for automatically manufacturing end plates and attaching end plates to railroad ties where each railroad tie has a first side, a second side, an upper surface, a lower surface, a first end, and a second end, each railroad tie having a height extending between the upper and the lower surfaces and a width extending between the first and the second sides, comprising the steps of:

moving a plurality of railroad ties on a main conveyor to sequentially position each of the railroad ties at an initial feed position;

stopping and holding each of the railroad ties at the initial feed position;

sensing that one of the railroad ties is positioned at the initial feed position and outputting a signal indicating that one of the railroad ties is positioned at the initial feed position;

sensing the size of at least one of the first and the second ends of the railroad tie positioned at the initial feed position and outputting a signal indicative of the sensed size;

removing the railroad tie at the initial feed position from the main conveyor and disposing the railroad tie on a speed-up conveyor;

moving the railroad tie on the speed-up conveyor from the initial feed position to an end plate assembly position;

sensing that one of the railroad ties is positioned at the end plate assembly position or that a railroad tie has been removed from the end plate assembly position and outputting a signal indicating that one of the railroad ties is positioned at the end plate assembly position or that one of the railroad ties has been removed from the end plate assembly position;

removing the railroad tie from the speed-up conveyor at the end plate assembly position;

engaging the first and the second sides and the upper and the lower surfaces of the railroad tie near the first and the seconds of the railroad tie positioned at the end plate assembly position for compressing portions of the railroad tie near the first and the second ends of the railroad tie after the railroad tie has been positioned at the end plate assembly position and removed from the speed-up conveyor; and manufacturing end plates in response to the signal indicating that one of the railroad ties is positioned at the initial feed position and connecting one of the end plates to the first end of each of the railroad ties after the railroad tie has been moved at the end plate assembly position, comprising the steps of:

(a) feeding a web of material having lead end to a press assembly, having a die set assembly and a press head assembly, positioned at the end plate assembly position near the first end of the railroad tie positioned at the end plate assembly position to position a portion of the web of material near the lead end thereof in a portion of the die set assembly, the web of material having a height extending between the first and the second sides of the web of material equal to one of the height or the width of the railroad tie to be positioned at the end plate assembly positioned;

(b) forming a predetermined number of nail members via the die set assembly on the portion of the web of material positioned in the die set assembly, the number of nail members formed in the web of material corresponding to the sensed size of the railroad tie in response to the signal indicating the size of the railroad tie at the initial feed position and to be positioned at the end plate assembly position;

(c) moving the web of material to move the lead end of the web of material to the press head assembly and to position the portion of the web of material having the nail members formed thereon in the press head assembly;

(d) cutting the web of material at a position spaced a distance from the lead end thereof corresponding to the sensed size of the railroad tie in response to the signal indicating the size of the railroad tie at the initial feed position and to be positioned at the end plate assembly position to remove the portion of the web of material having the nail members formed thereon from the web of material to form the end plate and releasibly holding the end plate cut from the web of material in the press head assembly;

(e) moving the web of material back toward the die set assembly to position a portion of the web of material near the lead end thereof in the die set assembly for forming the nail members on the next end plate to be manufactured;

(f) moving a portion of the press head assembly with the end plate held thereon to a position driving the nail members into the first end of the railroad tie positioned at the end plate assembly position for connecting the end plate to the first end of the railroad tie; and (g) moving the press head assembly back from the first end of the railroad tie positioned at the end plate assembly to position the press head assembly for receiving the next end plate; and manufacturing end plates in response to the signal indicating that one of the railroad ties is at the initial feed position and connecting one of the end plates to the second end of each of the railroad ties sequentially after the railroad tie has been moved to the end plate assembly position, comprising the steps of:

(h) feeding a web of material having lead end to a press assembly, having a die set assembly and a press head assembly, positioned at the end plate assembly position near the second end of the railroad tie positioned at the end plate assembly position to position a portion of the web of material near the lead end thereof in a portion of the die set assembly, the web of material having a height extending between the second and the second sides of the web of material equal to one of the height or the width of the railroad tie to be positioned at the end plate assembly positioned;

(i) forming a predetermined number of nail members via the die set assembly on the portion of the web of material positioned in the die set assembly, the number of nail members formed in the web of material corresponding to the sensed size of the railroad tie in response to the signal indicating the size of the railroad tie at the initial feed position and to be positioned at the end plate assembly position;

(j) moving the web of material to move the lead end of the web of material to the press head assembly and to position the portion of the web of material having the nail members formed thereon in the press head assembly;

(k) cutting the web of material at a position spaced a distance from the lead end thereof corresponding to the sensed size of the railroad tie in response to the signal indicating the size of the railroad tie at the initial feed position and to be positioned at the end plate assembly position to remove the portion of the web of material having the nail members formed thereon from the web of material to form the end plate and releasibly holding the end plate cut from the web of material in the press head assembly;

(1) moving the web of material back toward the die set assembly to position a portion of the web of material near the lead end thereof in the die set assembly for forming the nail members on the next end plate to be manufactured;

(m) moving a portion of the press head assembly with the end plate held thereon to a position driving the nail members into the second end of the railroad tie positioned at the end plate assembly position for connecting the end plate to the second end of the railroad tie; and (n) moving the press head assembly back from the second end of the railroad tie positioned at the end plate assembly to position the press head assembly for receiving the next end plate;

disengaging the first and the second sides and the upper and the lower surfaces of the railroad tie positioned at the end plate assembly position after the end plates have been connected to the first and the second ends thereof;

positioning the railroad tie with the end plates connected thereto on the speed-up conveyor;

moving the railroad tie on the speed-up conveyor from the end plate assembly position after the end plates have been connected thereto, to a discharge position; and wherein the step of removing the railroad tie at the initial feed position from the main conveyor and disposing the railroad tie on the speed-up conveyor further comprises removing the railroad tie at the initial feed position in response to the signal indicating that one of the other railroad ties has been removed from the end plate assembly position and disposing the railroad tie on the speed-up conveyor.

5. A method for automatically manufacturing end plates and connecting the end plates to railroad ties wherein each railroad tie has a first side, a second side, an upper surface, a lower surface, a first end and a second end, comprising the steps of:

moving sequentially a plurality of railroad ties to an end plate assembly position, comprising:

(a) moving each of the railroad ties sequentially to an initial feed position;

(b) stopping and releasibly holding the railroad ties at the initial feed position; and (c) releasing the railroad tie at the initial feed position and moving the railroad tie so released from the initial feed position to the end plate assembly position; and manufacturing end plates at the end plate assembly position;

connecting automatically one of the end plates to each of the first and the second ends of each of the railroad ties after the railroad tie has been moved to the end plate assembly position; and moving each of the railroad ties with the end plates connected thereto from the end plate assembly position to a discharge position.

6. The method of claim 5 wherein, prior to the step of releasing the railroad tie at the initial feed position and moving the railroad tie to the end plate assembly position, the method further comprises:

sensing the size of at least one of the first and the second ends of the railroad tie positioned at the initial feed position and outputting a signal indicative of the sensed size of at least one of the ends of the railroad tie positioned at the initial feed position; and wherein the step of manufacturing the end plates at the end plate assembly position further comprises manufacturing the end plates at the end plate assembly position having a size corresponding to the sensed size of at least one of the first and the second ends of the railroad tie positioned at the initial feed position.

7. A method for automatically manufacturing end plates and connecting the end plates to railroad ties wherein each railroad tie has a first side, a second side, an upper surface, a lower surface, a first end and a second end, comprising the steps:

moving sequentially a plurality of railroad ties to an end plate assembly position; and sensing the size of at least one of the first and the second ends of the railroad tie prior to moving the railroad tie to the end plate assembly position and outputting a signal indicative of the sensed size of at least one of the first and the second ends of the railroad tie;

manufacturing end plates at the end plate assembly position wherein the end plates each have a size corresponding to the sensed sized of at least one of the first and the second end of the railroad tie;

connecting automatically one of the end plates to each of the first and the second ends of each of the railroad ties after the railroad tie has been moved to the end plate assembly position; and moving each of the railroad ties railroad ties with the end plates connected thereto from the end plate assembly position to a discharge position.

8. A method for automatically manufacturing end plates and connecting the end plates to railroad ties wherein each railroad tie has a first side, a second side, an upper surface, a lower surface, a first end and a second end, and wherein each railroad tie has a width extending between the first and the second sides and a height extending between the upper and the lower surfaces, comprising the steps:

sensing the height of each railroad tie;

moving sequentially a plurality of railroad ties to an end plate assembly position and connecting automatically one of the end plates to each of the first and the second ends of the railroad ties after the railroad tie has been moved to the end plate assembly position, comprising:

manufacturing end plates at the end plate assembly position near the first side of the railroad tie positioned at the end plate assembly position comprising the steps of:

(a) feeding a web of material to the end plate assembly position having a lead end, a first side and a second side and a height extending between the first side and the second side thereof with the height of the web of material being about equal to at least one of the sensed height and known width of the railroad tie;

(b) forming a predetermined number of nail members corresponding to the sensed height of the railroad tie on a portion of the web of material near the lead end thereof;

(c) cutting the web of material at a position spaced a distance from the lead end of the web of material about equal to the known width of the railroad tie where the sensed height of the railroad tie is about equal to the height of the web of material to provide a first size of end plate, or cutting the web of material at a position spaced a distance from the lead end of the web of material about equal to the sensed height of the railroad tie where the known width of the railroad tie is about equal to the height of the web of material to provide a second size of end plate; and (d) connecting either the first size of end plate to the first end of the railroad tie positioned at the end plate assembly position where the sensed height of the railroad tie was about equal to the width of the web of material, or connecting the second size of end plate to the first end of the railroad tie at the end plate assembly position by rotating the second size of end plate about 90° where the known width of the railroad tie was about equal to the height of the web of material and then connecting the second size of end plate to the first end of the railroad tie at the end plate assembly position; and manufacturing end plates at the end plate assembly position near the second end of the railroad tie positioned at the end plate assembly position, comprising the steps of:

(e) feeding a web of material, to the end plate assembly position having a lead end, a first side and a second side and a height extending between the first side and the second side thereof with the height of the web of material being about equal to at least one of the sensed height and known width of the railroad tie;

(f) forming a predetermined number of nail members corresponding to the sensed height of the railroad tie on a portion of the web of material near the lead end thereof;

(g) cutting the web of material at a position spaced a distance from the lead end of the web of material about equal to the known width of the railroad tie where the sensed height of the railroad tie is about equal to the height of the web of material to provide a first size of end plate, and cutting the web of material at a position spaced a distance from the lead end of the web of material about equal where the sensed height of the railroad tie or the known width of the railroad tie is about equal to the width of the web of material to provide a second size of end plate; and (h) connecting the first size of end plate to the second end of the railroad tie positioned at the end plate assembly position where the sensed height of the railroad tie was about equal to the sensed with of the material, or connecting the second size of end plate to the second end of the railroad tie where the sensed web of the railroad tie was about equal to the width of the web of material by rotating the second size of end plate about 90° and then connecting the second size of end plate to the second end of the railroad tie at the end plate assembly position; and moving each of the railroad ties with the end plates connected thereto from the end plate assembly position to a discharge position.

9. A method for automatically manufacturing end plates and connecting the end plates to railroad ties wherein each railroad tie has a first side, a second side, an upper surface, a lower surface, a first end and a second end, comprising the steps:

moving sequentially a plurality of railroad ties to an end plate assembly position;

manufacturing end plates at the end plate assembly position and connecting automatically one of the end plates to each of the first and the second ends of each of the railroad ties after the railroad tie has been moved to the end plate assembly position, comprising:

(a) feeding a web of material having a lead end to position a portion of the web of material near the lead end thereof at the end plate assembly position;

(b) forming nail members on a portion of the web of material near the lead end thereof; and (c) cutting the web of material at a position spaced a distance from the lead end thereof to provide the end plate having the nail members formed thereon; and (d) connecting the end plate to the first end of the railroad tie via the nail members on the end plate; and manufacturing end plates at the end plate assembly position near the second end of the railroad tie positioned at the end plate assembly position, comprising:

(e) feeding a web of material having a lead end to position a portion of the web of material near the lead end thereof at the end plate assembly position;

(f) forming nail members on a portion of the web of material near the lead end thereof;

(g) cutting the web of material at a position spaced a distance from the lead end thereof to provide the end plate having the nail members formed thereon, and (h) connecting the end plate to the second end of the railroad tie via the nail members on the end plate.

moving each of the railroad ties with the end plates connected thereto from the end plate assembly position to a discharge position.

10. A method for automatically manufacturing end plates and connecting the end plates to railroad ties wherein each railroad tie has a first side, a second side, an upper surface, a lower surface, a first end and a second end, comprising the steps:

moving sequentially a plurality of railroad ties to an end plate assembly position;

manufacturing end plates at the end plate assembly position and connecting automatically one of the end plates to each of the first and second ends of each of the railroad ties after the railroad tie has been moved to the end plate assembly position, comprising:

(a) feeding a web of material having a lead end to a press assembly, having a die set assembly and a press head assembly, positioned at the end plate assembly position near the first end of the railroad tie positioned at the end plate assembly position to position a portion of the web of material near the lead end thereof in a portion of the die set assembly;

(b) forming a plurality of nail members via the die set assembly on a portion of the web of material near the lead end thereof positioned in the die set assembly;

(c) moving the web of material to move the lead end of the web of material to the press head assembly and to position the portion of the web of material having the nail members formed thereon in the press head assembly;

(d) cutting the web of material at a position spaced a distance from the lead end thereof to remove the portion of the web of material having the nail members formed thereon from the web of material to provide the end plate and removably holding the end plate cut from the web of material in the press head assembly;

(e) moving the web of material back toward the die set assembly to position a portion of the web of material near the lead end thereof in the die set assembly for forming the nail members on the web of material for the next end plate to be manufactured;

(f) moving a portion of the press head assembly with the end plate held thereon to a position driving the nail members into the first end of the railroad tie positioned at the end plate assembly position for connecting the end plate to the first end of the railroad tie; and (g) moving the press head assembly back from the first end of the railroad tie positioned at the end plate assembly position to position the press head assembly for receiving the next end plate; and (h) repeating the steps defined in paragraphs a-g above to form subsequent end plates for connection to the first end of subsequent railroad ties positioned at the end plate assembly position; and manufacturing end plates and connecting one of the end plates to the second end of each of the railroad ties after the railroad tie has been moved to the end plate assembly position, comprising the steps of:

(k) feeding a web of material having a lead end to a press assembly, having a die set assembly and a press head assembly, positioned at the end plate assembly position near the second end of the railroad tie positioned at the end plate assembly position to position a portion of the web of material near the lead end thereof in a portion of the die set assembly;

(j) forming a plurality of nail members via the die set assembly on a portion of the web of material near the lead end thereof positioned in the die set assembly;

(k) moving the web of material to move the lead end of the web of material to the press head assembly and to position the portion of the web of material having the nail members formed thereon in the press head assembly;

(l) cutting the web of material at a position spaced a distance from the lead end thereof to remove the portion of the web of material having the nail members formed thereon from the web of materials to provide the end plate and removably holding the end plate cut from the web of material in the press head assembly;

(m) moving the web of material back toward the die set assembly to position a portion of the web of material near the lead end thereof in the die set assembly for forming the nail members on the web of material for the next end plate to be manufactured;

(n) moving a portion of the press head assembly with the end plate held thereon to a position driving the nail members into the second end of the railroad tie positioned at the end plate assembly position for connecting the end plate to the second end of the railroad tie;

(o) moving the press head assembly back from the second end of the railroad tie positioned at the end plate assembly position to position a press head assembly for receiving the next end plate; and (p) repeating steps (i) through (o) to form subsequent end plates for connection to the second end of subsequent railroad has positioned at the end plate assembly position; and moving each of the railroad ties with the end plates connected thereto from the end plate assembly position to a discharge position.

11. A method for automatically manufacturing end plates and connecting the end plates to railroad ties wherein each railroad tie has a first side, a second side, an upper surface, a lower surface, a first end and a second end, and wherein each railroad tie has a width extending between the first and the second sides thereof and a height extending between the upper and the lower surfaces thereof, comprising the steps:

sensing the height of each railroad tie;

moving sequentially a plurality of railroad ties to an end plate assembly position after sensing the height of the railroad tie;

manufacturing end plates at the end plate assembly position and connecting automatically one of the end plates to each of the first and the second ends of each of the railroad tie has been moved to the end plate assembly position, comprising:

(a) feeding a web of material having lead end to a press assembly, having a die set assembly and a press head assembly, positioned at the end plate assembly position near the first end of the railroad tie positioned at the end plate assembly position to position a portion of the web of material near the lead end thereof in a portion of the die set assembly, the web of material having a height extending between the first and the second sides of the web of material equal to one of the height or the width of the railroad tie to be positioned at the end plate assembly positioned;

(b) forming a predetermined number of nail members via the die set assembly on the portion of the web of material positioned in the die set assembly, the number of nail members formed in the web of material corresponding to the sensed height of the railroad tie to be positioned at the end plate assembly position;

(c) moving the web of material to move the lead end of the web of material to the press head assembly and to position the portion of the web of material having the nail members formed thereon in the press head assembly;

(d) cutting the web of material at a position spaced a distance from the lead end thereof about equal to the known width of the railroad tie positioned at the end plate assembly position where the sensed height of the railroad tie is about equal to the height of the web of material to provide a first size of end plate or cutting the web of material at a position spaced a distance from the lead end thereof about equal to the sensed height of the railroad tie to be positioned at the end plate assembly position where the known width of the railroad tie to be positioned at the end plate assembly position is about equal to the height of the web of material to provide a second size of end plate and releasibly holding the end plate cut from the web of material in the press head assembly;

(e) moving the web of material back toward the die set assembly to position a portion of the web of material near the lead end thereof in the die set assembly for forming the nail members for the next end plate to be manufactured;

(f) rotating the second size of end plate held in the press head assembly about 90°;

(g) moving a portion of the press head assembly with the end plate held thereon to a position driving the nail members into the first end of the railroad tie position at the end plate assembly position for connecting the end plate to the first end of the railroad tie; and (h) moving the press head assembly back from the first end of the railroad tie positioned at the end plate assembly to position the press head assembly for receiving the next end plate; and manufacturing end plates and connecting one of the end plates to the second end of each of the railroad ties after the railroad tie has been moved to the end plate assembly position, comprising the steps of:

(i) feeding a web of material having lead end to a press assembly, having a die set assembly and a press head assembly, positioned at the end plate assembly position near the second end of the railroad tie positioned at the end plate assembly position to position a portion of the web of material near the lead end thereof in a portion of the die set assembly, the web of material having a height extending between the second and the second sides of the web of material equal to one of the height or the width of the railroad tie to be positioned at the end plate assembly positioned;

(j) forming a predetermined number of nail members via the die set assembly on the portion of the web of material positioned in the die set assembly, the number of nail members formed in the web of material corresponding to the sensed height of the railroad tie to be positioned at the end plate assembly position;

(k) moving the web of material to move the lead end of the web of material to the press head assembly and to position the portion of the web of material having the nail members formed thereon in the press head assembly;

(l) cutting the web of material at a position spaced a distance from the lead end thereof about equal to the known width of the railroad tie positioned at the end plate assembly position where the sensed height of the railroad tie is about equal to the height of the web of material to provide a first size of end plate or cutting the web of material at a position spaced a distance from the lead end thereof about equal to the sensed height of the railroad tie to be positioned at the end plate assembly position where the known width of the railroad tie to be positioned at the end plate assembly position is about equal to the height of the web of material to provide a second size of end plate and releasibly holding the end plate cut from the web of material in the press head assembly;

(m) moving the web of material back toward the die set assembly to position a portion of the web of material near the lead end thereof in the die set assembly for forming the nail members for the next end plate to be manufactured;

(n) rotating the second size of end plate held in the press head assembly about 90°;

(o) moving a portion of the press head assembly with the end plate held thereon to a position driving the nail members into the second end of the railroad tie position at the end plate assembly position for connecting the end plate to the second end of the railroad tie; and (p) moving the press head assembly back from the second end of the railroad tie positioned at the end plate assembly to position the press head assembly for receiving the next end plate; and moving each of the railroad ties with the end plates connected thereto from the end plate assembly position to a discharge position.

12. The method of claim 11 wherein prior to connecting the end plates to the first and the second ends of the railroad tie positioned at the end plate assembly positioned, the method further comprises:

engaging the first and the second sides and the upper and the lower surfaces of the railroad tie near the first and the second ends of the railroad tie positioned at the end plate assembly position for compressing portions of the railroad tie near the first and the second ends of the railroad tie prior to connecting the end plates to the first and the second ends of the railroad tie and maintaining said engaging during the connecting of the end plates to the railroad tie at the end plate assembly position; and wherein prior to the step of moving the railroad ties from the end plate assembly position to the discharge position, the method further comprises:

releasing the engagement with the first and the second sides of the upper and lower surfaces of the railroad tie positioned at the end plate assembly position prior to moving the railroad tie with the end plates connected thereto to the discharge position.

13. The method of claim 11 wherein the step of moving sequentially a plurality of railroad ties to the end plate assembly position further comprises:

moving the railroad ties to sequentially position one of the railroad ties at an initial feed position;

stopping and holding sequentially each of the railroad ties at the initial feed position; and wherein the step of sensing the height of the railroad tie is further defined as sensing the height of each railroad tie positioned at the initial feed position prior to moving the railroad tie to the end plate assembly position; and wherein the step of moving the railroad tie to the end plate assembly position further comprises:

moving the railroad tie from the initial feed position to the end plate assembly position; and stopping the railroad tie at the end plate assembly position prior to compressing the railroad tie near the first and the second ends thereof.

* * * * *

Disclaimer and Dedication 5,168,627—S. Hudson Owen, Marshfield, Wis. RAILROAD TIE END PLATE ATTACHMENT METHOD. Patent dated Dec. 8, 1992. Disclaimer and dedication filed Apr. 30, 2003, by the assignee, Kerr-McGee Chemical LLC.

Hereby disclaims and dedicates to the Public, the remaining term of said patent.

*(Official Gazette, July 15, 2003)*